(12) United States Patent
Ariyama et al.

(10) Patent No.: US 9,261,875 B2
(45) Date of Patent: Feb. 16, 2016

(54) SUPPORT APPARATUS, DESIGN SUPPORT PROGRAM, AND DESIGN SUPPORT METHOD

(75) Inventors: Masato Ariyama, Kawasaki (JP); Kazuhiro Sakai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 797 days.

(21) Appl. No.: 13/595,238

(22) Filed: Aug. 27, 2012

(65) Prior Publication Data

US 2013/0090753 A1 Apr. 11, 2013

(30) Foreign Application Priority Data

Oct. 7, 2011 (JP) ................................ 2011-223445

(51) Int. Cl.
*G06F 17/50* (2006.01)
*G05B 19/4097* (2006.01)

(52) U.S. Cl.
CPC .................. *G05B 19/4097* (2013.01)

(58) Field of Classification Search
USPC ....................................................... 716/118
See application file for complete search history.

(56) References Cited

U.S. PATENT DOCUMENTS

| | | | | |
|---|---|---|---|---|
| 5,847,968 | A * | 12/1998 | Miura et al. | 716/123 |
| 2002/0101214 | A1* | 8/2002 | Iisaka et al. | 318/600 |
| 2003/0027363 | A1* | 2/2003 | Kodama | 438/14 |
| 2010/0244276 | A1* | 9/2010 | Burleson et al. | 257/777 |
| 2012/0246929 | A1* | 10/2012 | Nakamura | 29/834 |

FOREIGN PATENT DOCUMENTS

| | | |
|---|---|---|
| JP | 04-069774 | 3/1992 |
| JP | 6-149912 | 5/1994 |
| JP | 8-227428 | 9/1996 |
| JP | 2000-207438 | 7/2000 |

OTHER PUBLICATIONS

Japanese Office Action mailed Jun. 9, 2015 in related Japanese Application No. 2011-223445.

* cited by examiner

*Primary Examiner* — Mohammed Alam
(74) *Attorney, Agent, or Firm* — Staas & Halsey LLP

(57) ABSTRACT

A design-support-apparatus includes a storage unit that stores mounting information on an order of manufacturing processes, first-region-information indicating a region to be secured in mounting of each component on the substrate, second-region-information indicating a region occupied when each component is mounted on the substrate, a discrimination unit configured to determine a before-and-after relationship between manufacturing processes of mounting a first-component and a second-component that are arranged on the substrate, an acquisition unit configured to acquire the first-region-information for the component of which the manufacturing process is determined to be later by the discrimination unit between the first component and the second-component and acquire the second-region-information for the component of which the manufacturing process is determined to be earlier, and a determination unit configured to compare the first-region-information and the second-region-information so as to determine presence of interference.

9 Claims, 29 Drawing Sheets

FIG. 3

| IDENTIFICATION KEY | REGION CLASSIFICATION | SHAPE (SHADED PART) | |
|---|---|---|---|
| IMD | OCCUPIED REGION | ▨ | —30 |
| IMD | MANUAL REGION | ▨ | —30 |
| | ⋮ | | |

FIG. 4

| ORDER | MANUFACTURING PROCESS |
|---|---|
| 1 | REFLOW |
| – | FLOW |
| 2 | POST-ATTACHMENT |
| – | PRESS-IN |
| 3 | MECHANISM ASSEMBLING |
| – | INSPECTION |
| – | SETTING ADJUSTMENT |
| – | TEST |
| – | REWORK |

FIG. 5

| IDENTIFICATION FLAG | IDENTIFICATION KEY | MANUFACTURING PROCESS ||||| 
|---|---|---|---|---|---|---|
| | | REFLOW | FLOW | POST-ATTACHMENT | PRESS-IN | MECHANISM ASSEMBLING |
| MOUNTING CATEGORY | IMD | UNDEFINED | OCCUPIED REGION | MANUAL REGION | UNDEFINED | UNDEFINED |
| MOUNTING CATEGORY | SMD | COMPONENT BODY REGION | OCCUPIED REGION | UNDEFINED | UNDEFINED | UNDEFINED |
| MOUNTING CATEGORY | POST-ATTACHING COMPONENT | UNDEFINED | UNDEFINED | JIG REGION | UNDEFINED | UNDEFINED |
| MOUNTING CATEGORY | PRESS-FIT COMPONENT | UNDEFINED | UNDEFINED | UNDEFINED | JIG REGION | UNDEFINED |
| MOUNTING CATEGORY | MECHANISM COMPONENT | UNDEFINED | UNDEFINED | UNDEFINED | UNDEFINED | ATTACHMENT REGION |
| ARRANGEMENT TYPE | ABC | UNDEFINED | OCCUPIED REGION | MANUAL REGION | JIG REGION | UNDEFINED |
| ARRANGEMENT TYPE | 123 | UNDEFINED | OCCUPIED REGION | MANUAL REGION | JIG REGION | UNDEFINED |
| COMPONENT NAME | IC11 | UNDEFINED | OCCUPIED REGION | MANUAL REGION | JIG REGION | UNDEFINED |
| COMPONENT NAME | CN22 | UNDEFINED | OCCUPIED REGION | MANUAL REGION | JIG REGION | UNDEFINED |

FIG. 6

| ORDER | IDENTIFICATION FLAG |
|---|---|
| 1 | COMPONENT NAME |
| 2 | COMPONENT TYPE |
| 3 | MOUNTING CATEGORY |

FIG. 11

| ORDER | MANUFACTURING PROCESS | PRIORITY | IDENTIFICATION FLAG | IDENTIFICATION KEY | APPLICATION REGION |
|---|---|---|---|---|---|
| 1 | REFLOW | 1 | MOUNTING CATEGORY | SMD | OCCUPIED REGION |
|   |   | 2 | COMPONENT NAME | CN100 | JIG REGION |
| 2 | FLOW | 1 | MOUNTING CATEGORY | IMD | OCCUPIED REGION |
| 3 | POST-ATTACHMENT | 1 | COMPONENT NAME | IC50 | BODY REGION |
| 4 | PRESS-IN | 1 | COMPONENT NAME | CN200 | JIG REGION |
| 5 | MECHANISM ASSEMBLING | 1 | ARRANGEMENT TYPE | ABC123 | ASSEMBLING REGION |
|   |   |   |   | XYZ789 | OCCUPIED REGION |

FIG. 13

| ORDER | MANUFACTURING PROCESS |
|---|---|
| 1 | REFLOW |
| 2 | FLOW |
| 3 | POST-ATTACHMENT |
| – | PRESS-IN |
| 4 | MECHANISM ASSEMBLING |
| – | INSPECTION |
| – | SETTING ADJUSTMENT |
| – | TEST |
| – | REWORK |

FIG. 15

| CORRESPONDING COMPONENT | INTERFERENCE CHECK CORRESPONDING COMPONENT REGION |
|---|---|
| SMD | OCCUPIED REGION |
| IMD | OCCUPIED REGION |
| POST-ATTACHING COMPONENT | MANUAL REGION |
| MECHANISM COMPONENT | MANUAL REGION |

FIG. 16

| ORDER | MANUFACTURING PROCESS | IDENTIFICATION FLAG | IDENTIFICATION KEY | APPLICATION REGION |
|---|---|---|---|---|
| 1 | REFLOW | MOUNTING CATEGORY | SMD | OCCUPIED REGION |
| 2 | FLOW | MOUNTING CATEGORY | IMD | OCCUPIED REGION |
| 3 | POST-ATTACHMENT | MOUNTING CATEGORY | POST-ATTACHING COMPONENT | MANUAL REGION |
| 4 | MECHANISM ASSEMBLING | MOUNTING CATEGORY | MECHANISM COMPONENT | ATTACHMENT REGION |

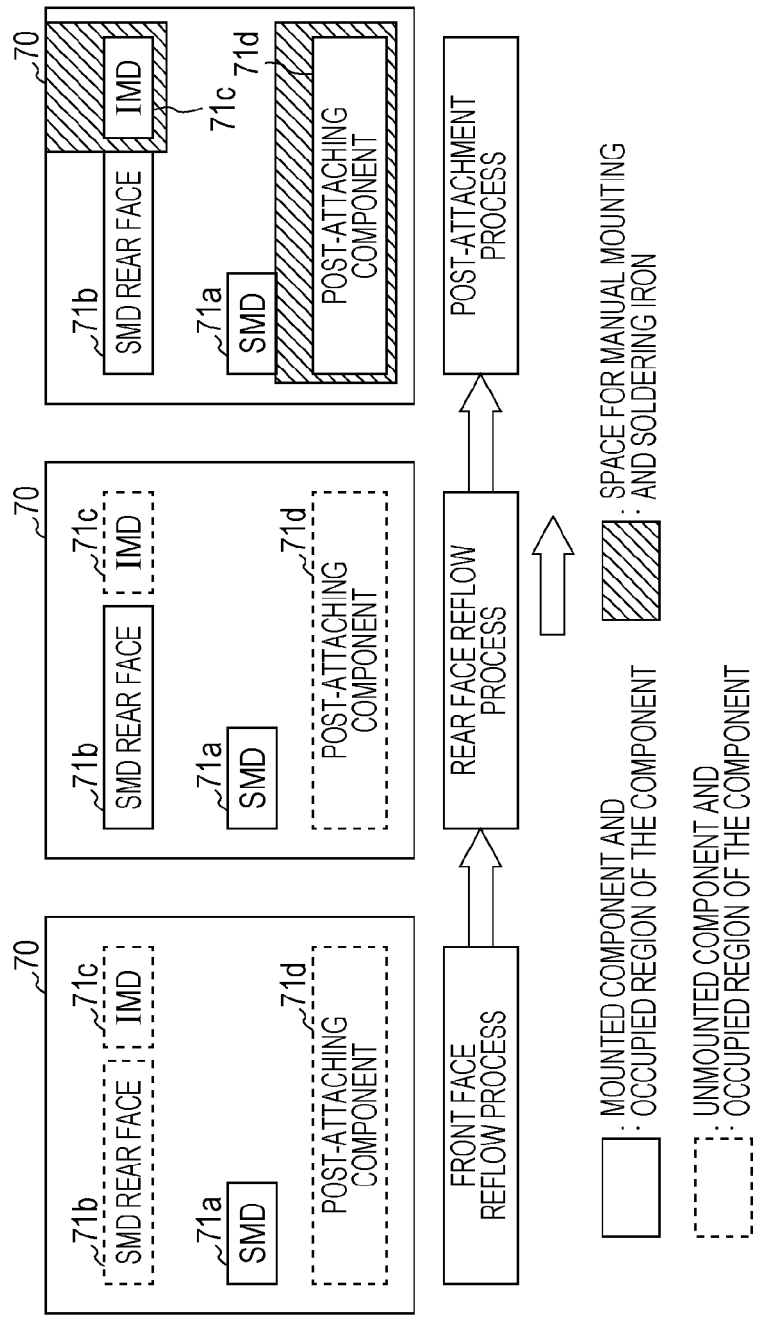

FIG. 18

| ORDER | MANUFACTURING PROCESS | MANUFACTURING PROCESS (DESCRIPTION) |
|---|---|---|
| 1 | REFLOW | REFLOW SOLDERING |
| - | FLOW | FLOW SOLDERING |
| 2 | POST-ATTACHMENT | POST-ATTACHMENT |
| - | PRESS-IN | PRESS-IN OPERATION |
| - | MECHANISM ASSEMBLING | ASSEMBLING OF MECHANISM COMPONENT |
| - | INSPECTION | EXTERNAL APPEARANCE INSPECTION |
| - | SETTING ADJUSTMENT | SETTING OPERATION OF ADJUSTMENT COMPONENT AND THE LIKE |
| - | TEST | GENERAL TEST |
| - | REWORK | COMPONENT DETACHMENT, REMOUNTING |

FIG. 20

| CORRESPONDING COMPONENT | INTERFERENCE CHECK CORRESPONDING COMPONENT REGION |
|---|---|
| SMD | OCCUPIED REGION |
| IMD | MANUAL REGION |
| POST-ATTACHING COMPONENT | MANUAL REGION |

FIG. 21

| ORDER | MANUFACTURING PROCESS | IDENTIFICATION FLAG | IDENTIFICATION KEY | APPLICATION REGION |
|---|---|---|---|---|
| 1 | REFLOW | MOUNTING CATEGORY | SMD | OCCUPIED REGION |
| 2 | POST-ATTACHMENT | MOUNTING CATEGORY | IMD | MANUAL REGION |
| | | | POST-ATTACHING COMPONENT | |

FIG. 23

| ORDER | MANUFACTURING PROCESS |
|---|---|
| 1 | REFLOW |
| 2 | FLOW |
| – | POST-ATTACHMENT |
| – | PRESS-IN |
| – | MECHANISM ASSEMBLING |
| – | INSPECTION |
| – | SETTING ADJUSTMENT |
| – | TEST |
| – | REWORK |

FIG. 25

| ORDER | IDENTIFICATION FLAG |
|---|---|
| 1 | COMPONENT NAME |
| 2 | MOUNTING CATEGORY |

FIG. 26

| CORRESPONDING COMPONENT | INTERFERENCE CHECK CORRESPONDING COMPONENT REGION |
|---|---|
| SMD-CN1 | JIG REGION |
| SMD-CN2 | JIG REGION |
| IMD | OCCUPIED REGION |
| POST-ATTACHING COMPONENT | OCCUPIED REGION |

FIG. 27

| ORDER | MANUFACTURING PROCESS | PRIORITY | IDENTIFICATION FLAG | IDENTIFICATION KEY | APPLICATION REGION |
|---|---|---|---|---|---|
| 1 | REFLOW | 1 | COMPONENT NAME | SMD-CN1 | JIG REGION |
| | | | | SMD-CN2 | JIG REGION |
| | | 2 | MOUNTING CATEGORY | SMD | OCCUPIED REGION |
| 2 | FLOW | 1 | MOUNTING CATEGORY | IMD | OCCUPIED REGION |

SUPPORT APPARATUS, DESIGN SUPPORT PROGRAM, AND DESIGN SUPPORT METHOD

CROSS-REFERENCE TO RELATED APPLICATION

This application is based upon and claims the benefit of priority of the prior Japanese Patent Application No. 2011-223445, filed on Oct. 7, 2011, the entire contents of which are incorporated herein by reference.

FIELD

The embodiments discussed herein are related to a design support apparatus, a design support program, and a design support method.

BACKGROUND

Design support apparatuses which support circuit design such as a computer aided design (CAD) apparatus and the like have been widespread. With a design support apparatus, a user repeatedly selects any of components which are to be arranged on a substrate as an arranging object component and arranges the arranging object component on the substrate, thus performing circuit design. In circuit design, as an interval between components on a substrate is reduced, components can be arranged in higher density. However, when an interval between components is too small, it may be difficult to mount components in a manufacturing process. Accordingly, a design support apparatus sets a region, for each component, which is to be secured in mounting of a component as an interference check region and checks whether interference check regions of respective components interfere each other or not, thus determining propriety of component arrangement.

Further, regarding a design support apparatus, the following techniques have been proposed. For example, such technique has been proposed that in a region on a substrate, an arrangement position of a component and a wiring route of wiring between components are alternately decided while avoiding components of which arrangement positions have been decided and wiring routs, so as to perform circuit design of high density. Further, such technique has been proposed that a width dimension of a gap between each pair of components arranged on a substrate and a minimum value of a gap between each pair of inputted components are turned into data and sizes of the gap width dimension and the minimum gap value are checked so as to design a printed board with higher density. Furthermore, such technique has been proposed that a candidate position on which a component is to be arranged is set on one face of a substrate, a candidate position of a soldering face is set on the other face of the substrate, and an arrangement position of a component is decided when the both candidate positions are not used for arrangement of a component.

Japanese Laid-open Patent Publication No. 8-227428, Japanese Laid-open Patent Publication No. 2000-207438, and Japanese Laid-open Patent Publication No. 4-69774 are examples of related art.

Apropos, there is a case where manufacturing processes in mounting of respective components which are arranged on a substrate are different from each other, so that it is not demanded to secure a region for mounting a component on the substrate even in a manufacturing process after mounting of respective components, as an interference check region. Therefore, as related art, in a case where a region to be secured in mounting of a component is set to be an interference check region and interference check of interference check regions of respective components is performed, the components may be arranged with excessively large intervals therebetween.

However, the fact that an interval to be secured with respect to other components varies due to difference in manufacturing processes of respective components is not taken into consideration in any of the techniques of related art. Therefore, components may be arranged with excessively large intervals therebetween.

SUMMARY

According to an aspect of the invention, a design support apparatus includes a storage unit that stores mounting information on an order of manufacturing processes in which each component is mounted on a substrate and a component that is mounted in each manufacturing process, first region information indicating a region to be secured in mounting of each component on the substrate, second region information indicating a region occupied when each component is mounted on the substrate, a discrimination unit configured to determine a before-and-after relationship between manufacturing processes of mounting a first component and a second component that are arranged on the substrate that is a designing object, an acquisition unit configured to acquire the first region information for the component of which the manufacturing process is determined to be later by the discrimination unit between the first component and the second component and acquire the second region information for the component of which the manufacturing process is determined to be earlier, and a determination unit configured to compare the first region information and the second region information so as to determine presence of interference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of the data configuration of a component shape library;

FIG. 4 illustrates an example of the data configuration of a manufacturing process table;

FIG. 5 illustrates an example of the data configuration of an application region table;

FIG. 6 illustrates an example of the data configuration of a priority order table;

FIG. 11 illustrates an example of the data configuration of a table of a case where various types of information is stored in one table;

FIG. 13 illustrates a manufacturing process table in which manufacturing processes performed in mounting of respective components depicted in FIG. 12 and an order of the manufacturing processes are stored;

FIG. 15 illustrates an example of a region to be secured for each component;

FIG. 16 illustrates an example of the data configuration of a table of a case where various types of information is stored in one table;

FIG. 17 illustrates another example of a manufacturing process in which each component is mounted on a substrate and arranging components;

FIG. 18 illustrates a manufacturing process table in which manufacturing processes performed in mounting of respective components depicted in FIG. 17 and an order of the manufacturing processes are stored;

FIG. 20 illustrates an example of a region to be secured for each component;

FIG. 21 illustrates an example of the data configuration of a table of a case where various types of information is stored in one table;

FIG. 23 illustrates a manufacturing process table in which manufacturing processes performed in mounting of respective components depicted in FIG. 22 and an order of the manufacturing processes are stored;

FIG. 25 illustrates an example of the data configuration of a priority order table;

FIG. 26 illustrates an example of a region to be secured for each component;

FIG. 27 illustrates an example of the data configuration of a table of a case where various types of information is stored in one table;

DESCRIPTION OF EMBODIMENTS

A design support apparatus, a design support program, and a design support method according to embodiments of the present disclosure are described in detail below with reference to the accompanying drawings. Here, the present disclosure is not limited to these embodiments. The embodiments may be arbitrarily combined with each other within a scope of processing contents.

Embodiment 1

Figure 1:
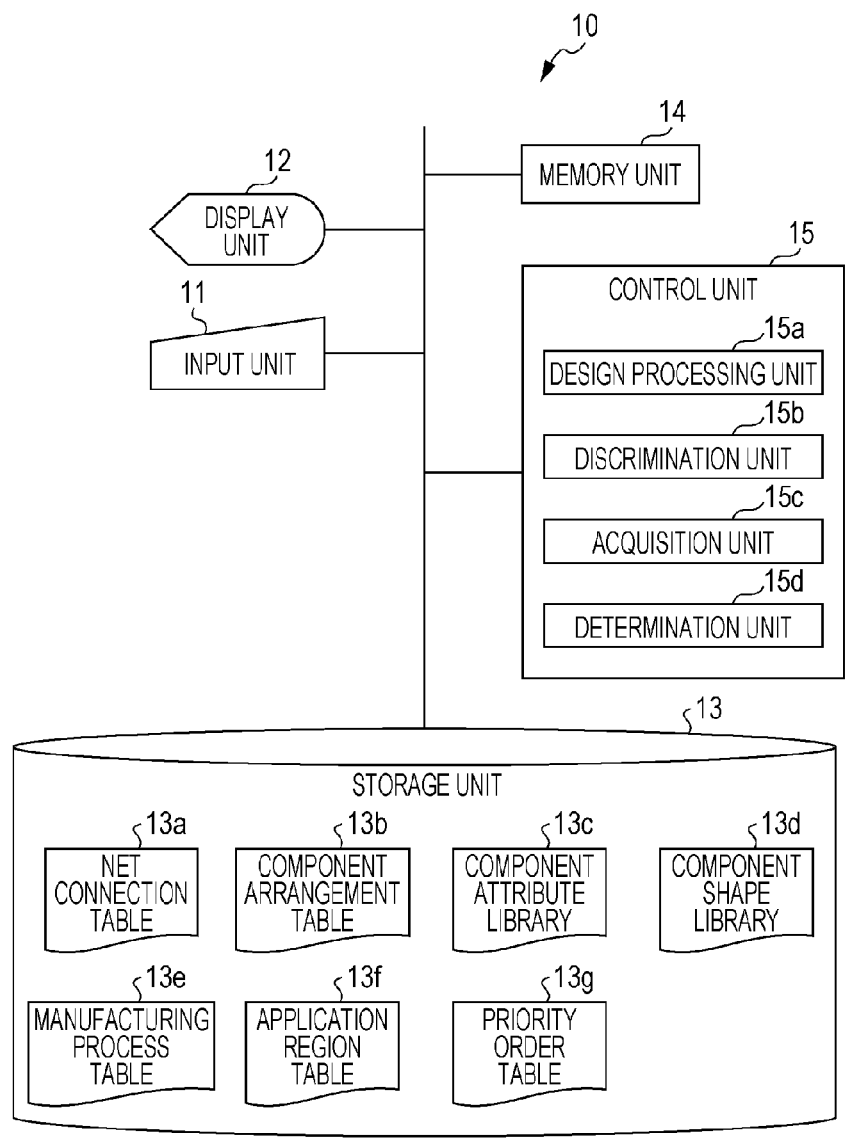
FIG. 1 illustrates the whole configuration of a design support apparatus.

A design support apparatus according to Embodiment 1 is described. FIG. 1 illustrates the whole configuration of the design support apparatus. This design support apparatus 10 is a computer which supports circuit design by a user, such as a CAD apparatus. As depicted in FIG. 1, the design support apparatus 10 includes an input unit 11, a display unit 12, a storage unit 13, a memory unit 14, and a control unit 15.

The input unit 11 inputs various types of information into the control unit 15. For example, the input unit 11 receives instruction of a component which is to be arranged on a substrate which is a designing object and instruction of an arrangement position of the component on the substrate from a user and inputs operation information indicating received operation contents into the control unit 15. The input unit 11 is an operation reception device such as a mouse and keyboards, for example.

The display unit 12 displays various types of information. For example, the display unit 12 displays a design screen on which circuit design is performed by arranging various components on a substrate. On this design screen, a substrate which is a designing object and various components to be arranged on the substrate are displayed, for example. Further, when an error such as interference occurs among arranged components, information on the occurring error is displayed on the design screen. The display unit 12 is a display device such as a liquid crystal display (LCD) and a cathode ray tube (CRT), for example.

The storage unit 13 stores various types of information. The storage unit 13 stores a net connection table 13a, a component arrangement table 13b, a component attribute library 13c, a component shape library 13d, a manufacturing process table 13e, an application region table 13f, and a priority order table 13g, for example. The storage unit 13 is a semiconductor memory which can rewrite data such as a flash memory and a non-volatile static random access memory (NVSRAM) or a storage device such as a hard disk and an optical disk, for example.

The net connection table 13a is a table for storing information indicating a connection relationship among terminals of various components for circuit design. The component arrangement table 13b is a table for storing information indicating an arrangement position, on a substrate, of each component which is arranged on the substrate. The component attribute library 13c is a table for storing various types of attribute information about components, such as a component name of a component for circuit design, a type of a component, and a mounting category of a component. The component name is identification information such as a code and a name which is given for identifying a component. Identical identification information is added to same components. The type is information indicating a kind of a component. For example, identical identification information is added to components which are classified to have the same functions and sizes. The mounting category is obtained by categorizing components in accordance with a mounting method in which a component is mounted on a substrate. Examples of the mounting category include an insertion mount device (IMD), a surface mount device (SMD), a post-attaching component, a mechanism component, and the like. The component shape library 13d is a table for storing information indicating various regions of respective components.

Figure 2:
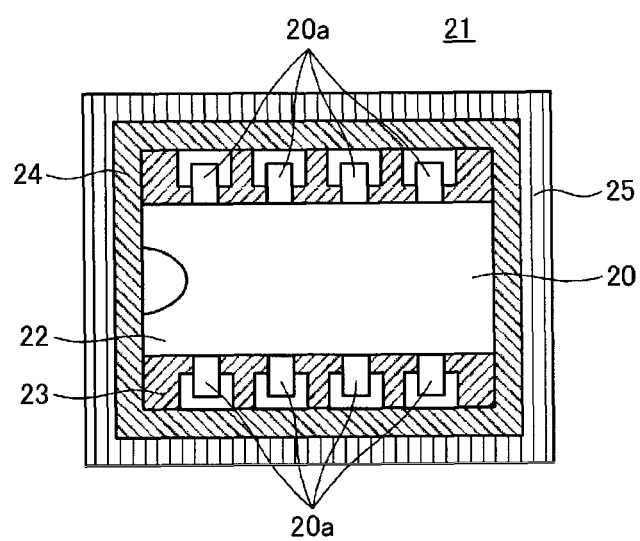
FIG. 2 illustrates an example of various regions of a component.

Various regions of a component are now described. FIG. 2 illustrates an example of various regions of a component. An integrated circuit 20 is depicted in FIG. 2 as an example of a component. The integrated circuit 20 depicted in FIG. 2 has a rectangular shape, and is provided with four terminals 20a on each of opposed two side faces, that is, provided with eight terminals 20a. In this embodiment, an outline region of a component is referred to as a component body region. For example, regarding the integrated circuit 20 depicted in FIG. 2, an outline region including the terminals 20a is set to a component body region 22.

When a component is arranged on a substrate 21, it is difficult to arrange other component on a part, which is covered by the component, of the substrate. Further, in a periphery of the integrated circuit 20 on the substrate, there may be a region in which it is difficult to arrange other components, even though the region is not covered by the component. Such region that it is difficult to arrange other components is set to be an occupied region which is occupied by a component when the component is mounted on the substrate. For example, regarding the integrated circuit 20 depicted in FIG. 2, parts between the terminals 20a of the integrated circuit 20 and adjacent part of the terminals 20a are regions in which it is difficult to arrange other components, so that a rectangular region surrounding the terminals 20a in a manner to circumscribe the terminals 20a are set to be an occupied region 23.

Further, on the substrate, there is a region to be secured for mounting a component in arrangement of components. For example, when a person manually mounts a component on a substrate with a soldering iron, it is preferable that a manual region which is used for manually mounting a component by putting the soldering iron be secured in a periphery of the component on the substrate so as to mount the component on the substrate. Further, when a component is mounted on the substrate with a jig, it is preferable that a jig region for arranging a jig on the substrate be secured. For example, regarding the integrated circuit 20 depicted in FIG. 2, a region including the integrated circuit 20 and a peripheral space for putting a soldering iron is set to be a manual region 24 and a region including the integrated circuit 20 and a space for arranging a jig is set to be a jig region 25. In the example of FIG. 2, the component body region 22 is included in the occupied region 23, the occupied region 23 is included in the manual region 24, and the manual region 24 is included in the jig region 25. However, hatching of the larger region is omitted in superposed regions so as to facilitate identification of respective regions.

The component shape library 13d stores region information indicating a component body region and an occupied region of a corresponding component, for each component. The component shape library 13d further stores region information indicating a region to be secured in mounting of a component on the substrate. For example, the component shape library 13d stores region information indicating a manual region and a jig region. Further, the component shape library 13d stores region information indicating a manual region and a jig region for every component type and mounting category of a component. The region information indicating a manual region and a jig region may be defined as a coordinate from a center of a component or may be defined as a coordinate representing a range expanding from an occupied region of a component. Various types of information stored in the component shape library 13d may be preliminarily registered regarding standard components or may be registered by a user from the input unit 11 or from a terminal device such as a client computer which can communicate with the design support apparatus 10.

FIG. 3 illustrates an example of the data configuration of the component shape library. As depicted in FIG. 3, the component shape library 13d includes columns of items which are an identification key, a region classification, and a shape. The column of the item of the identification key is a region for storing identification information which is added for every component name, type, and mounting category. The column of the item of the region classification is a region for storing a kind of a region. The column of the item of the shape is a region for storing region information indicating a region. In the example of FIG. 3, regions which are indicated by region information are depicted as graphics in the column of the item of the shape.

The example of FIG. 3 illustrates that an identification key is stored as "IMD", a region kind is stored as an "occupied region", and region information indicating that a region from two faces on the upper and lower sides of a component 30 to predetermined distant positions is an occupied region is stored. Further, it is illustrated that an identification key is stored as "IMD", a region kind is stored as a "manual region", and region information indicating that a region having a space, in which a soldering iron can be put, provided from each side face of the component 30 is a manual region is stored.

The manufacturing process table 13e is a table for storing manufacturing processes performed in mounting of a component on a substrate and an order of the manufacturing processes. FIG. 4 illustrates an example of the data configuration of the manufacturing process table. As depicted in FIG. 4, the manufacturing process table 13e includes columns of items which are an order and a manufacturing process. The column of the item of the order is a region for storing an order of manufacturing processes to be performed. In the column of the item of the order, a digit representing a performed order is set in a case of a manufacturing process which is to be performed, and "-" is set in a case of a manufacturing process which is not to be performed. The column of the item of the manufacturing process is a region for storing manufacturing processes of mounting a component on a substrate. In the manufacturing process table 13e, manufacturing processes having the potential to be performed in mounting of a component on a substrate are registered. In the example of FIG. 4, "reflow", "flow", "post-attachment", "press-in", "mechanism assembling", "inspection", "setting adjustment", "test", and "rework" are registered as manufacturing processes. "Reflow" indicates a manufacturing process of soldering a component by a reflow process so as to mount the component. "Flow" indicates a manufacturing process of soldering a component by a flow process so as to mount the component. "Post-attachment" indicates a manufacturing process in which a person solders a component with a soldering iron so as to mount the component. "Press-in" indicates a manufacturing process of mounting a component with a press-in jig. "Mechanism assembling" indicates a manufacturing process of attaching a mechanism component by a screw or the like so as to mount the mechanism component. "Inspection" indicates an inspection process in which an external appearance of a substrate on which components are mounted is inspected. "Setting adjustment" indicates an adjustment process in which an adjustment operation of an adjustment component which can be adjusted is performed. "Test" indicates a test process in which a general test of a substrate is performed. "Rework" indicates a remounting process in which a component is detached and remounted.

In the example of FIG. 4, the order "1", the order "2", and the order "3" are respectively set for "reflow", "post-attachment", and "mechanism assembling", indicating that manufacturing processes are performed in the order of "reflow", "post-attachment", and "mechanism assembling".

The application region table 13f is a table for storing designation information for designating a region to be secured, for every manufacturing process. FIG. 5 illustrates an example of the data configuration of the application region table. As depicted in FIG. 5, the application region table 13f includes columns of items which are an identification flag, an identification key, and a manufacturing process. The column of the item of the manufacturing process is divided into columns of manufacturing processes having the potential to be performed in mounting of a component on a substrate. In the example of FIG. 5, the column of the item of the manufacturing process is divided into columns of items which are "reflow", "flow", "post-attachment", "press-in", and "mechanism assembling". The item of the identification flag indicates whether designation of a region to be secured is performed in a unit of a component name, a type, or a mounting category. The column of the item of the identification key is a region for storing identification information which is added for every component name, type, and mounting category. The column of the item of the manufacturing process is a region for storing designation information designating a region which is applied as a region to be secured, for every component which can be mounted in each manufacturing process. In the column of the item of the manufacturing process, a region which is applied as a region to be secured is set in a case of a manufacturing process in which a component identified by an identification key can be mounted, and "undefined" is set in a case of a manufacturing process in which it is difficult to mount the component.

In the example of FIG. 5, the identification key "IMD" indicates that the identification flag is set as "mounting category", that is, a region to be secured is designated in mounting category unit. Further, the identification key "IMD" indicates that a region to be secured is designated in manufacturing processes of "flow" and "post-attachment", that is, mounting is possible in the manufacturing processes of "flow" and "post-attachment". Further, the identification key "IMD" indicates that a region to be secured is an "occupied region" in the manufacturing process of "flow", and a region to be secured is a "manual region" in the manufacturing processes of "post-attachment".

Further, in the example of FIG. 5, the identification key "ABC" indicates that the identification flag is set as an "arrangement type", that is, a region to be secured is designated by type unit. Further, the identification key "ABC" indicates that a region to be secured is designated in manufacturing processes of "flow", "post-attachment", and "press-in", that is, mounting is possible in the manufacturing processes of "flow", "post-attachment", and "press-in". Further, the identification key "ABC" indicates that a region to be secured is an "occupied region" in the manufacturing process of "flow", a region to be secured is a "manual region" in the manufacturing process of "post-attachment", and a region to be secured is a "jig region" in the manufacturing process of "press-in".

Further, in the example of FIG. 5, the identification key "IC11" indicates that the identification flag is set as "component name", that is, a region to be secured is designated in component name unit. Further, the identification key "IC11" indicates that a region to be secured is designated in manufacturing processes of "flow", "post-attachment", and "press-in", that is, mounting is possible in the manufacturing processes of "flow", "post-attachment", and "press-in". Further, the identification key "IC11" indicates that a region to be secured is an "occupied region" in the manufacturing process of "flow", a region to be secured is a "manual region" in the manufacturing process of "post-attachment", and a region to be secured is a "jig region" in the manufacturing process of "press-in".

The priority order table 13g is a table for storing whether priority is given to a component name, a type, or a mounting category. FIG. 6 illustrates an example of the data configuration of the priority order table. As depicted in FIG. 6, the priority order table 13g includes columns of items which are an order and an identification flag. The column of the item of the order is a region for storing a number representing an order of priority. The column of the item of the identification flag is a region for storing whether the designation of an order of priority is performed by a component name, a type, or a mounting category.

The example of FIG. 6 illustrates that the order of priority of a region to be secured in component name unit is the first place, the order of priority of a region to be secured in type unit is the second place, and the order of priority of a region to be secured in mounting category unit is the third place.

Returning to the description of FIG. 1, the memory unit 14 is a data rewritable non-volatile memory and temporarily stores various types of information. For example, the memory unit 14 is used as a work area when the control unit 15, described later, performs various types of processing. The memory unit 14 is a semiconductor memory such as a random access memory (RAM), for example.

The control unit 15 is an electronic circuit such as a central processing unit (CPU) and a micro processing unit (MPU), for example, and includes a design processing unit 15a, a discrimination unit 15b, an acquisition unit 15c, and a determination unit 15d.

The design processing unit 15a performs various types of control on circuit design. For example, the design processing unit 15a performs control of making the display unit 12 display various types of information such as a substrate which is a designing object, each component to be arranged on the substrate, a connection relationship among terminals of respective components, and the like. Further, the design processing unit 15a performs control of setting a component, of which a selecting indication operation is received by the input unit 11, to a selected state so as to arrange the selected component on a designated arrangement position on a substrate which is a designing target. Further, the design processing unit 15a performs control of displaying error display of components determined that interference is present, on the basis of a determination result of presence/absence of interference between components, which is obtained by the determination unit 15d described later. A user repeatedly selects any of components to be arranged on a substrate, as an arranging object component from the input unit 11 and performs an indication operation to arrange the arranging object component on the substrate, thus performing circuit design.

Figure 7:
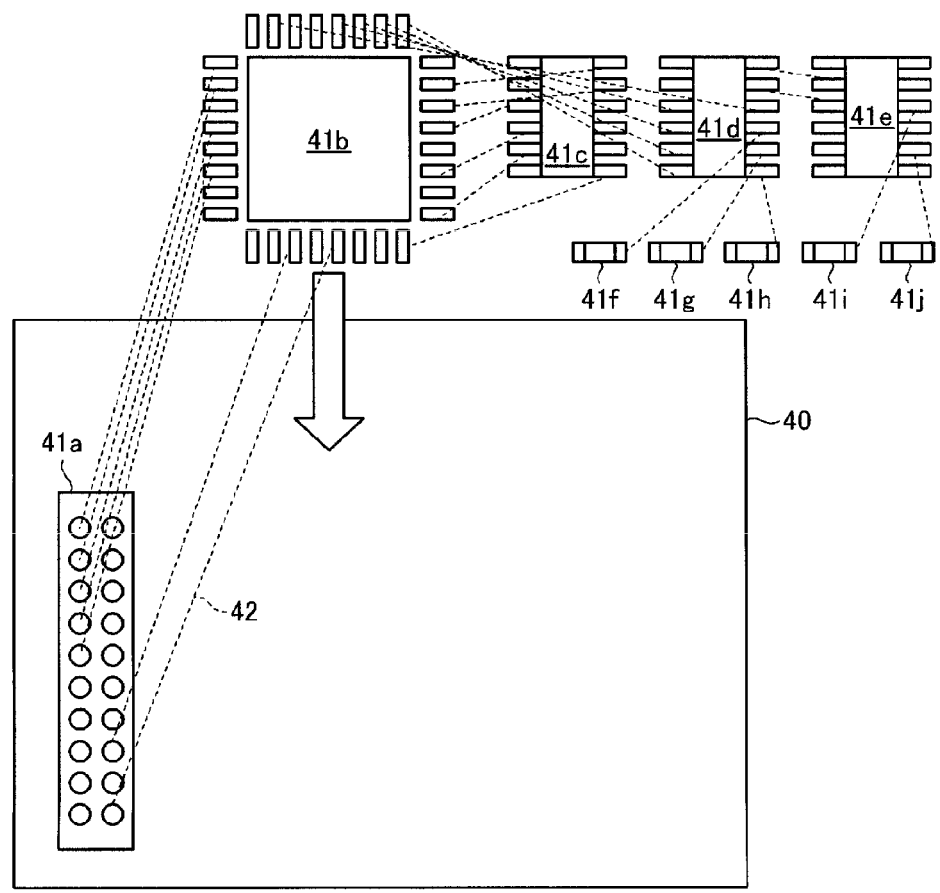
FIG. 7 illustrates an example of a circuit design screen which is displayed on a display unit in circuit design.
Figure 8:
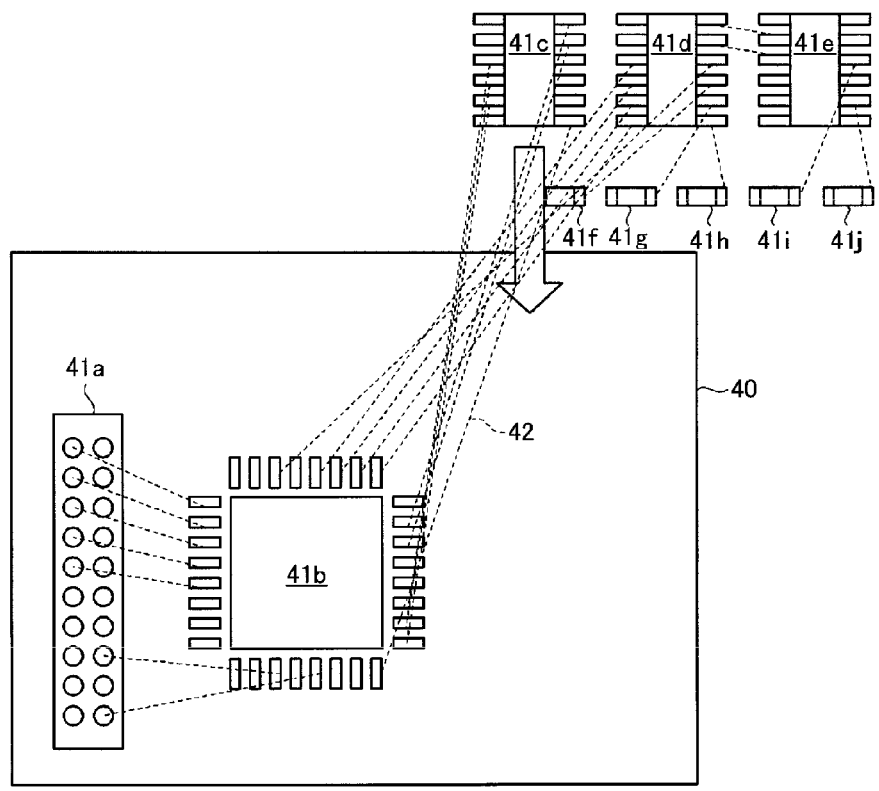
FIG. 8 illustrates an example of a circuit design screen which is displayed on the display unit in circuit design.
Figure 9:
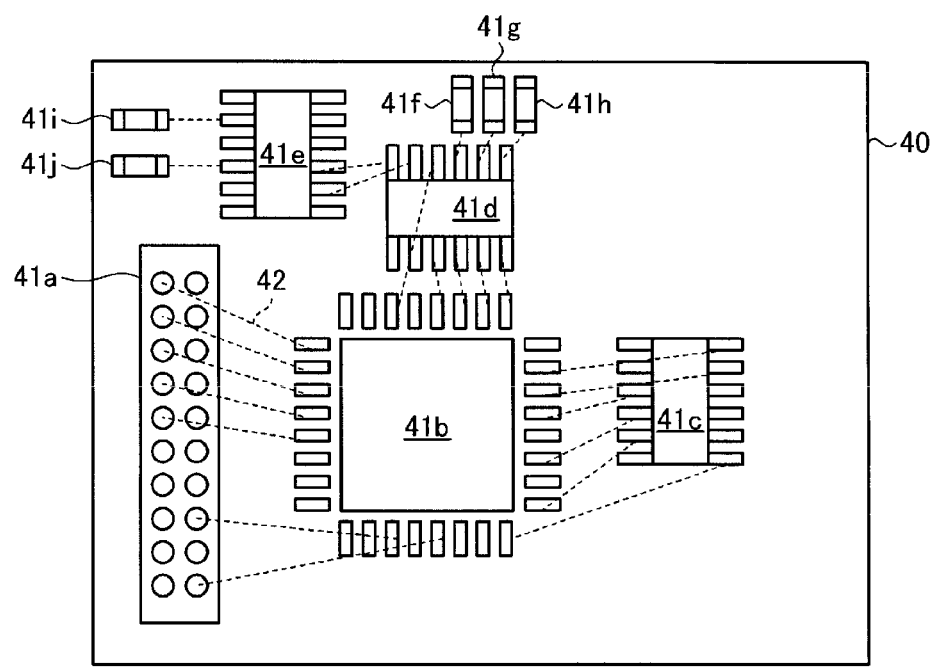
FIG. 9 illustrates an example of a circuit design screen which is displayed on the display unit in circuit design.

FIGS. 7 to 9 illustrate an example of a circuit design screen which is displayed on the display unit in circuit design. In the example of FIGS. 7 to 9, a substrate 40 which is a designing object and components 41a to 41j are displayed, and a connection relationship among terminals of the components 41a to 41j based on the net connection table 13a is represented by a net 42. The example of FIG. 7 illustrates a state that the component 41b is selected to be arranged on the substrate 40. The example of FIG. 8 illustrates that the selected component 41b has been arranged on the substrate 40. The example of FIG. 9 illustrates a state that the components 41a to 41j have been arranged on the substrate 40.

The discrimination unit 15b determines a before-and-after relationship between manufacturing processes of respective components arranged on a substrate which is a designing object. For example, when a component is arranged on a substrate, the discrimination unit 15b specifies an adjacent component which is arranged adjacent to a periphery of the arranged component which is arranged on the substrate. The discrimination unit 15b specifies a component which is within a predetermined distance from the arranged component which is arranged on the substrate, as an adjacent component, for example. This predetermined distance may have a fixed value, may be set to have an arbitrary value by a person using the design support apparatus 10, or may vary in accordance with a size of an arranged component and a size of a region in which interference check of the arranged component is performed.

Figure 10:
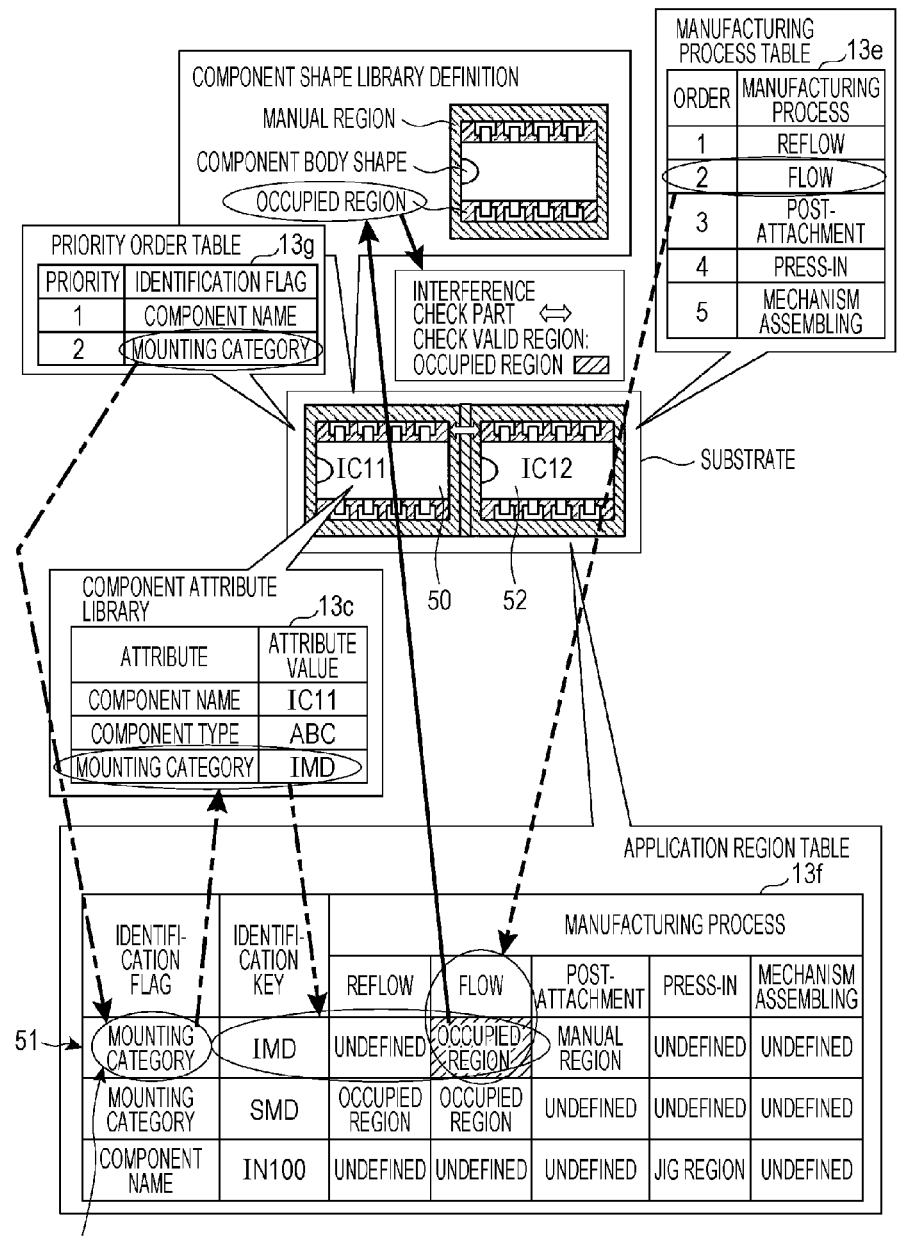
FIG. 10 illustrates a flow of specifying a manufacturing process of a component and a region to be secured.

The discrimination unit 15b specifies manufacturing processes of an arranged component and a specified adjacent component. Specifying of manufacturing processes of components is performed as the following. FIG. 10 illustrates a flow of specifying a manufacturing process of a component and a region to be secured. The example of FIG. 10 illustrates a flow of specifying a manufacturing process and a region of a component 50 of which a component name is "IC11", a component type is "ABC", and a mounting category is "IMD". The discrimination unit 15b obtains a record which corresponds to a component name, a type, and a mounting category for every component of which a manufacturing process is to be specified, from the application region table 13f. In the example of FIG. 10, a record 51 of which an identification flag is "mounting category", and an identification key is "IMD" in the application region table 13f is obtained. The discrimination unit 15b specifies a record of which an order of priority is the highest in the priority order table 13g, among obtained records. In the example of FIG. 10, an obtained record is only the record 51, so that the record 51 is specified as the record of which the order of priority is the highest.

The discrimination unit 15b specifies a manufacturing process of which a performing order is the highest in the manufacturing process table 13e as a manufacturing process of a corresponding component, among manufacturing processes, in which a region to be secured is designated, of the specified record 51 of the application region table 13f. In the example of FIG. 10, among respective manufacturing processes of the record 51, a region to be secured is designated as an "occupied region" in the manufacturing process of "flow" and is designated as a "manual region" in the manufacturing process of "post-attachment". Therefore, the manufacturing process of "flow" and the manufacturing process of "post-attachment" are candidates of the manufacturing process of the component 50. In the example of FIG. 10, the manufacturing process of "flow" precedes the manufacturing process of "post-attachment" in the manufacturing process table 13e, so that "flow" is specified as the manufacturing process of the component 50. The discrimination unit 15b not only specifies the manufacturing process, but also specifies a region which is designated as a region to be secured in the specified manufacturing process of the specified record 51 of the application region table 13f. In the example of FIG. 10, the "occupied region" in the manufacturing process of "flow" is specified as a region to be secured for the component 50.

The discrimination unit 15b thus specifies manufacturing processes of an arranged component which is arranged on a substrate and each adjacent component. Then, the discrimination unit 15b determines the before-and-after relationship between manufacturing processes of an arranged component and each adjacent component.

The acquisition unit 15c acquires region information to be used for interference check from the component shape library 13d, on the basis of a determination result of the before-and-after relationship between manufacturing processes obtained by the discrimination unit 15b, for every pair of an arranged component and each adjacent component. For example, regarding a component of which a manufacturing process is determined to be performed earlier between an arranged component and an adjacent component, the acquisition unit 15c acquires region information indicating a region occupied by the corresponding component, from the component shape library 13d. Further, regarding a component of which a manufacturing process is determined to be performed later between an arranged component and an adjacent component, the acquisition unit 15c acquires region information indicating a region specified as a region to be secured, from the component shape library 13d. When it is determined that manufacturing processes of an arranged component and an adjacent component are same as each other, the acquisition unit 15c acquires region information indicating a region which is specified as a region to be secured, regarding the arranged component, from the component shape library 13d. Further, regarding the adjacent component, the acquisition unit 15c acquires region information indicating a region occupied by the corresponding component, from the component shape library 13d.

The determination unit 15d compares region information of an arranged component and region information of an adjacent component that are acquired by the acquisition unit 15c, so as to determine presence/absence of interference, for every pair of the arranged component and each adjacent component. For example, among arranged components and adjacent components on a substrate which is a designing object, the determination unit 15d compares an occupied region of a component of which a manufacturing process is determined to be performed earlier and a region specified as a region to be secured for a component of which a manufacturing process is determined to be performed later, so as to determine presence/absence of interference. Further, when manufacturing processes of an arranged component and an adjacent component are same as each other, the determination unit 15d compares a region specified as a region to be secured for the arranged component and an occupied region of the adjacent component, so as to determine presence/absence of interference. For example, it is assumed that a manufacturing process of mounting a component 52 which is depicted in FIG. 10 and arranged in the vicinity of the component 50 is same as a manufacturing process of mounting the component 50. In this case, the determination unit 15d compares an occupied region specified as a region to be secured for the component 50 with an occupied region of the component 52 so as to determine presence/absence of interference.

Here, regarding a component mounted on a substrate, it is preferable that a region to be secured in mounting of the component on the substrate be secured from other components until a manufacturing process of mounting the corresponding component, but the region to be secured in mounting on the substrate does not have to be secured from other components in manufacturing processes after the mounting.

Therefore, the determination unit 15d performs interference check by using a region to be secured in mounting on a substrate until a manufacturing process of mounting the corresponding component, for every component. Further, the determination unit 15d performs interference check by using an occupied region in a manufacturing process after the manufacturing process of mounting the corresponding component, for every component.

That is, when a manufacturing process of an adjacent component which is an interference check object precedes with a manufacturing process of an arranged component, it is preferable to preliminarily secure a region which is larger than an occupied region, such as a manual region and a jig region, for the arranged component, from the adjacent component. On the other hand, it is sufficient to secure an occupied region for the adjacent region which is a partner of the interference check. When a manufacturing process of an arranged component goes after or same as a manufacturing process of an adjacent component which is an interference check object, the determination unit 15d compares a region to be secured for the arranged component on the substrate which is a designing object with an occupied region of the adjacent component which is the interference check object, so as to determine presence/absence of interference.

When a manufacturing process of an adjacent component which is an interference check object goes after a manufacturing process of an arranged component, it is preferable to preliminarily secure a region which is larger than an occupied region, such as a manual region and a jig region, for the adjacent component, from the arranged component. On the other hand, it is sufficient to secure an occupied region for the arranged component. When the manufacturing process of the arranged component precedes the manufacturing process of the adjacent component which is the interference check object, the determination unit 15d compares an occupied region of the arranged component on the substrate which is the designing object with a region to be secured for the adjacent component which is the interference check object, so as to determine presence/absence of interference.

When interference presence is determined as a determination result, the determination unit 15d notifies the design processing unit 15a of components determined that interference is present, so as to allow the design processing unit 15a to perform error display.

Here, in this embodiment, the case where various types of information is stored in the manufacturing process table 13e, the application region table 13f, and the priority order table 13g separately has been described, but the disclosed apparatus is not limited to this case. For example, various types of information may be stored in one table. FIG. 11 illustrates an example of the data configuration of a table of a case where various types of information is stored in one table. As depicted in FIG. 11, the table includes columns of items which are an order, a manufacturing process, priority, an identification flag, an identification key, and an application region. The column of the item of the order is a region for storing an order of manufacturing processes to be performed. The column of the item of the manufacturing process is a region for storing a manufacturing process in which a component is mounted on a substrate. The column of the item of the priority is a region for storing a number representing an order of priority of an application region. The column of the item of the identification flag indicates whether a region to be secured is designated in a unit of a component name, a type, or a mounting category. The column of the item of the identification key is a region for storing identification information which is added for every component name, type, and mounting category. The column of the item of the application region is a region for storing designation information for designating a region to be applied as a region to be secured.

The example of FIG. 11 illustrates that when the priority is "1" in the manufacturing process "reflow" in the order of "1", an "occupied region" is designated as a region to be secured with respect to the identification flag of "mounting category" and the identification key of "SMD". Further, it is illustrated that when the priority is "2" in the manufacturing process "reflow" in the order of "1", a "jig region" is designated as a region to be secured with respect to the identification flag of "component name" and the identification key of "CN100".

Figure 12:
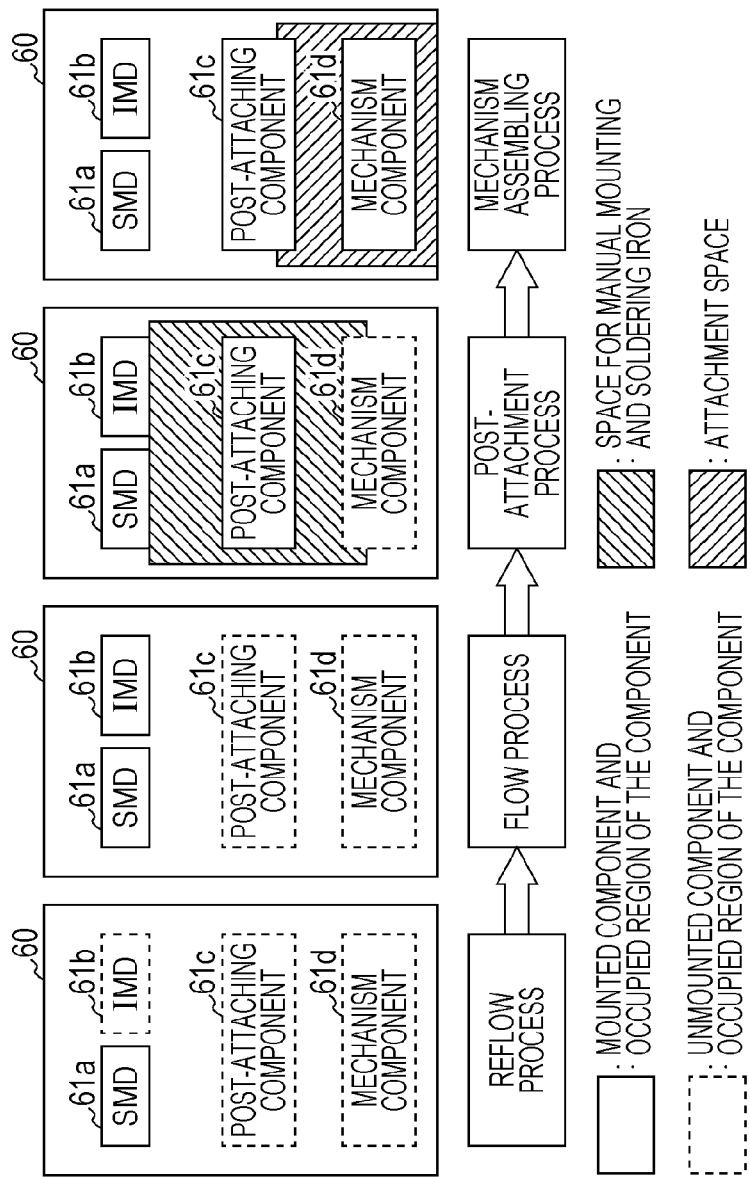
FIG. 12 illustrates an example of a manufacturing process in which each component is mounted on a substrate and arranging components.

A specific example to perform interference check among components is now described. FIG. 12 illustrates an example of a manufacturing process in which respective components are mounted on a substrate and components to be arranged. In the example of FIG. 12, a component 61a of an SMD is first mounted in a reflow process, a component 61b of an IMD is next mounted in a flow process, a post-attaching component 61c is then mounted in a post-attachment process, and a mechanism component 61d is subsequently mounted in a mechanism assembling process. FIG. 13 illustrates a manufacturing process table which stores manufacturing processes performed in mounting of respective components depicted in FIG. 12 and an order of the manufacturing processes. In the example of FIG. 13, the order "1", the order "2", the order "3", and the order "4" are respectively set for "reflow", "flow", "post-attachment", and "mechanism assembling", indicating that manufacturing processes are performed in the order of "reflow", "flow", "post-attachment", and "mechanism assembling".

Figure 14:
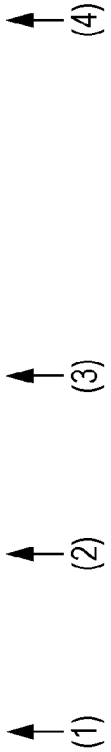
FIG. 14 illustrates an example of the data configuration of an application region table.

Further, it is assumed that the application region table 13f is set as depicted in FIG. 14 regarding regions to be secured for the components 61a to 61d. FIG. 14 illustrates an example of the data configuration of the application region table. In the example of FIG. 14, the identification key "IMD" indicates that a region to be secured is designated in manufacturing processes of "flow" and "post-attachment", that is, mounting is possible in the manufacturing processes of "flow" and "post-attachment". Further, the identification key "IMD" indicates that a region to be secured is designated as an "occupied region" in a case where mounting is performed in the manufacturing process of "flow" and a region to be secured is designated as a "manual region" in a case where mounting is performed in the manufacturing process of "post-attachment".

Further, in the example of FIG. 14, the identification key "SMD" indicates that a region to be secured is designated in manufacturing processes of "reflow" and "flow", that is, mounting is possible in the manufacturing processes of "reflow" and "flow". Further, the identification key "SMD" indicates that a region to be secured is designated as an "occupied region" in a case where mounting is performed in the manufacturing processes of "reflow" and "flow".

Further, in the example of FIG. 14, the identification key "post-attaching component" indicates that a region to be secured is designated in a manufacturing process of "post-attachment", that is, mounting is possible in the manufacturing process of "post-attachment". Further, the identification key "post-attaching component" indicates that a region to be secured is designated as a "manual region" in a case where mounting is performed in the manufacturing process of "post-attachment".

Further, in the example of FIG. 14, regarding a component of the identification key of "mechanism component", it is indicated that a region to be secured is designated in a manufacturing process of "mechanism assembling", that is, mounting is possible in the manufacturing process of "mechanism assembling". Further, regarding a component of the identification key of "mechanism component", it is indicated that a region to be secured is designated as an "attachment region" in a case where mounting is performed in the manufacturing process of "mechanism assembling".

The discrimination unit 15b specifies a manufacturing process of which a performing order is the highest in the manufacturing process table 13e as a manufacturing process of a corresponding component, among manufacturing processes in which a region to be secured for each of the components 61a to 61d is designated in the application region table 13f. Further, the discrimination unit 15b specifies a region which is designated as a region to be secured in the specified manufacturing process. In this example, a record corresponding to the application region table 13f is one for each component, so that description of specifying a record in accordance with the order of priority is omitted. For example, the discrimination unit 15b refers to respective manufacturing processes of the application region table 13f in an order of manufacturing processes performed in the manufacturing process table 13e as an order of (1) to (4) of FIG. 14. Since an occupied region of the identification key "SMD" is set in the reflow process, the discrimination unit 15b specifies the reflow process as a manufacturing process of the component 61a of the SMD. Further, the discrimination unit 15b specifies an occupied region as a region to be secured for the component 61a of the SMD. On the other hand, since regions to be secured for the components 61b to 61d are undefined in the reflow process, the discrimination unit 15b refers to the following flow process. Since an occupied region of the identification key "IMD" is set in the flow process, the discrimination unit 15b specifies the flow process as a manufacturing process of the component 61b of the IMD. Further, the discrimination unit 15b specifies the occupied region as a region to be secured for the component 61b of the IMD. On the other hand, since regions to be secured for the components 61c and 61d are undefined in the flow process, the discrimination unit 15b refers to the following post-attachment process. Since a manual region is set in the post-attachment process for the identification key "post-attaching component", the discrimination unit 15b specifies the post-attachment process as a manufacturing process of the post-attaching component 61c. Further, the discrimination unit 15b specifies the manual region as a region to be secured for the post-attaching component 61c. On the other hand, since a region to be secured for the component 61d is undefined in the flow process, the discrimination unit 15b refers to the following mechanism assembling process. Since an attachment region is set in the mechanism assembling process for the identification key "mechanism component", the discrimination unit 15b specifies the mechanism assembling process as a manufacturing process of the mechanism component 61d. Further, the discrimination unit 15b specifies the attachment region as a region to be secured for the mechanism component 61d. FIG. 15 illustrates an example of a region to be secured for each component. As depicted in FIG. 15, regions to be secured for the "SMD" and the "IMD" are specified as occupied regions. Further, regions to be secured for a "post-attaching component" and a "mechanism component" are specified as "manual regions".

The discrimination unit 15b determines a before-and-after relationship among manufacturing processes of respective components regarding the components 61a to 61d. Then, the determination unit 15d compares an occupied region of a component of which a manufacturing process on the substrate 60 is determined to be earlier with a region to be secured for a component of which a manufacturing process is determined to be later, so as to determine presence/absence of interference. For example, focusing on the post-attaching component 61c depicted in FIG. 12, it is assumed that interference check between the post-attaching component 61c and an adjacent component is performed. The manufacturing process of the post-attaching component 61c is the post-attachment process of the order (3). The manufacturing processes of the component 61a of the SMD and the component 61b of the IMD which are adjacent components are respectively the reflow process of the order (1) and the flow process of the order (2). The determination unit 15d performs interference check among a manual region of the post-attaching component 61c, an occupied region of the component 61a of the SMD, and an occupied region of the component 61b of the IMD. On the other hand, the manufacturing process of the mechanism component 61d which is an adjacent component is the mechanism assembling process of the order (4). The determination unit 15d performs interference check between an occupied region of the post-attaching component 61c and an attachment region of the mechanism component 61d.

As described above, various types of information which are stored in the manufacturing process table 13e, the application region table 13f, and the priority order table 13g may be stored in one table. FIG. 16 illustrates an example of the data configuration of a table of a case where various types of information is stored in one table. FIG. 16 illustrates the data configuration which is obtained by removing the order from the table of FIG. 11. Respective items of FIG. 16 are same as those of FIG. 11, so that descriptions thereof are omitted.

FIG. 17 illustrates another example of manufacturing processes in which respective components are mounted on a substrate and components to be arranged. In the example of FIG. 17, a component 71a of an SMD is first mounted on a front face of a substrate 70 in a front face reflow process, a component 71b of the SMD is next mounted on a rear face of the substrate in a rear face reflow process, and a component 71c of an IMD and a post-attaching component 71d are subsequently mounted in a post-attachment process. In the example of FIG. 17, the component 71b of the SMD which is mounted on the rear face of the substrate is denoted as an "SMD rear face". FIG. 18 illustrates a manufacturing process table which stores manufacturing processes performed in mounting of respective components depicted in FIG. 17 and an order of the manufacturing processes. In the example of FIG. 18, the order "1" and the order "2" are respectively set for "reflow" and "post-attachment", indicating that manufacturing processes are performed in the order of "reflow" and "post-attachment".

Figure 19:
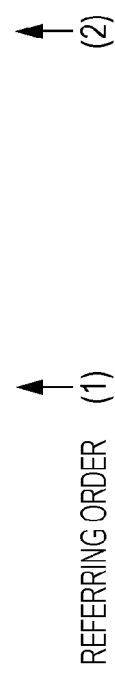
FIG. 19 illustrates an example of the data configuration of an application region table.

Further, it is assumed that the application region table 13f is set as depicted in FIG. 19 regarding regions to be secured for the components 71a to 71d. FIG. 19 illustrates an example of the data configuration of the application region table. In the example of FIG. 19, the identification key "IMD" indicates that a region to be secured is designated in manufacturing processes of "flow" and "post-attachment", that is, mounting is possible in the manufacturing processes of "flow" and "post-attachment". Further, the identification key "IMD" indicates that a region to be secured is designated as an "occupied region" in a case where mounting is performed in the manufacturing process of "flow" and a region to be secured is designated as a "manual region" in a case where mounting is performed in the manufacturing process of "post-attachment".

Further, in the example of FIG. 19, the identification key "SMD" indicates that a region to be secured is designated in manufacturing processes of "reflow" and "flow", that is, mounting is possible in the manufacturing processes of "reflow" and "flow". Further, the identification key "IMD" indicates that a region to be secured is designated as an "occupied region" in a case where mounting is performed in the manufacturing processes of "reflow" and "flow".

Further, in the example of FIG. 19, the identification key "post-attaching component" indicates that a region to be secured is designated in a manufacturing process of "post-attachment", that is, mounting is possible in the manufacturing process of "post-attachment". Further, the identification key "post-attaching component" indicates that a region to be secured is designated as a "manual region" in a case where mounting is performed in the manufacturing process of "post-attachment".

The discrimination unit 15b specifies a manufacturing process of which a performing order is the highest in the manufacturing process table 13e as a manufacturing process of a corresponding component, among manufacturing processes in which a region to be secured for each of the components 71a to 71d is designated in the application region table 13f. Further, the discrimination unit 15b specifies a region which is designated as a region to be secured in the specified manufacturing process. In this example, a record corresponding to the application region table 13f is one for each component, so that description of specifying a record in accordance with the order of priority is omitted. For example, the discrimination unit 15b refers to respective manufacturing processes of the application region table 13f in an order of manufacturing processes to be performed in the manufacturing process table 13e as an order of (1) and (2) of FIG. 19. Since an occupied region is set in the reflow process for the identification key "SMD", the discrimination unit 15b specifies the reflow process as manufacturing processes of the components 71a and 71b of the SMD. Further, the discrimination unit 15b specifies an occupied region as a region to be secured for the components 71a and 71b of the SMD. On the other hand, since regions to be secured for the components 71c and 71d are undefined in the reflow process, the discrimination unit 15b refers to the following post-attachment process. Since manual regions are set in the post-attachment process for the identification keys "IMD" and "post-attaching component", the discrimination unit 15b specifies the post-attachment process as the manufacturing processes of the components 71c and 71d. Further, the discrimination unit 15b specifies the manual regions as regions to be secured for the components 71c and 71d. Here, mounting of the component 71c of the IMD is possible also in the flow process, but the manufacturing process table 13e does not include the flow process. Therefore, the discrimination unit 15b specifies that soldering is performed in the post-attachment process. FIG. 20 illustrates an example of a region to be secured for each component. As depicted in FIG. 20, a region to be secured for the "SMD" is specified as an "occupied region". Further, regions to be secured for the "IMD" and the "post-attaching component" are specified as "manual regions".

The discrimination unit 15b determines a before-and-after relationship among manufacturing processes of respective components regarding the components 71a to 71d. Then, the determination unit 15d compares an occupied region of a component of which a manufacturing process on the substrate 70 is determined to be earlier with a region to be secured for a component of which a manufacturing process is determined to be later, so as to determine presence/absence of interference. For example, focusing on the component 71c of the IMD depicted in FIG. 17, it is assumed that interference check between the component 71c and an adjacent component is performed. The manufacturing process of the component 71c of the IMD is the post-attachment process of the order (2). The manufacturing processes of the components 71a and 71b of the SMD which are adjacent components are the reflow process of the order (1). The determination unit 15d performs interference check among a manual region of the component 71c of the IMD and occupied regions of the components 71a and 71b of the SMD. On the other hand, the manufacturing process of the post-attaching component 71d which is an adjacent component is the post-attachment process of the order (2), which is same as that of the component 71c of the IMD. The determination unit 15d performs interference check between a manual region of the component 71c of the IMD and an occupied region of the post-attaching component 71d.

As described above, various types of information which are stored in the manufacturing process table 13e, the application region table 13f, and the priority order table 13g may be stored in one table. FIG. 21 illustrates an example of the data configuration of a table of a case where various types of information is stored in one table. FIG. 21 illustrates the data configuration which is obtained by removing the order from the table of FIG. 11. Respective items of FIG. 21 are same as those of FIG. 11, so that descriptions thereof are omitted.

Figure 22:
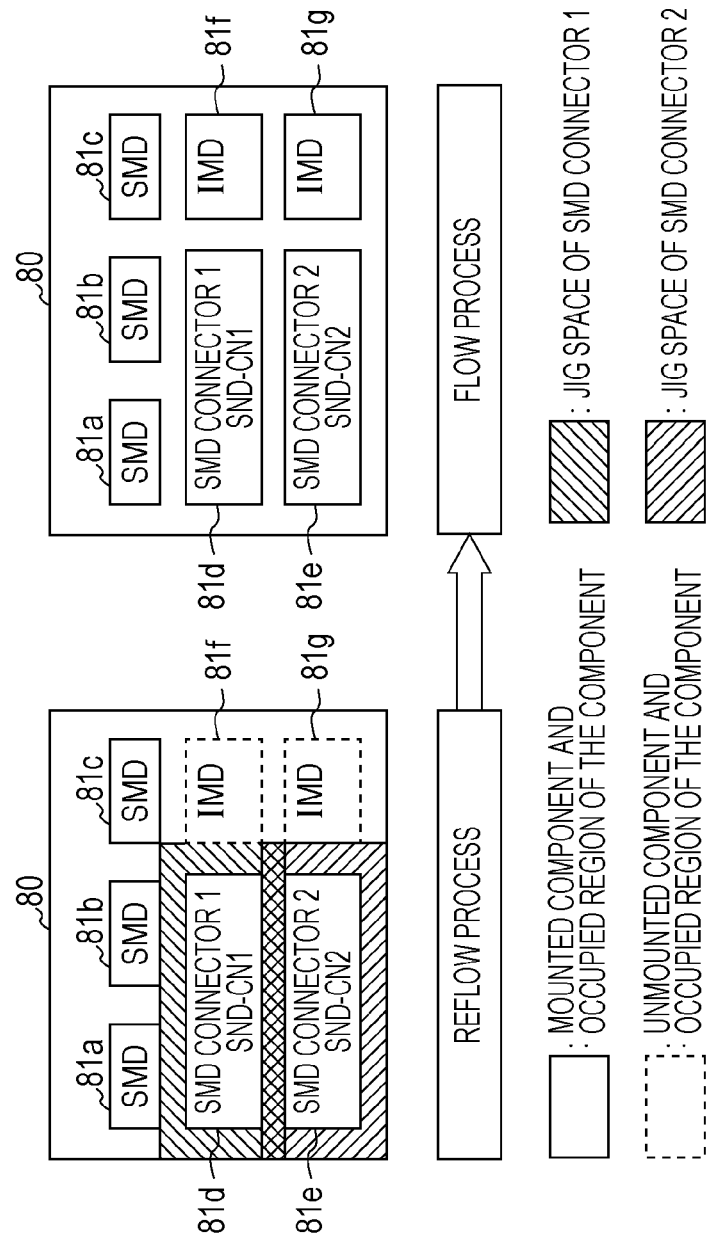
FIG. 22 illustrates still another example of a manufacturing process in which each component is mounted on a substrate and arranging components.

FIG. 22 illustrates still another example of manufacturing processes in which respective components are mounted on a substrate and components to be arranged. In the example of FIG. 22, components 81a to 81c of an SMD and SMD connectors 81d and 81e are first mounted on a substrate 80 in a reflow process and components 81f and 81g of an IMD are subsequently mounted in a flow process. The SMD connectors 81d and 81e are a kind of an SMD, so that the SMD connectors 81d and 81e are mounted in the reflow process as is the case with other components 81a to 81c of the SMD. However, a jig is used for mounting of the SMD connectors 81d and 81e. In the example of FIG. 22, component names are depicted on parts of the SMD connectors 81d and 81e. FIG. 23 illustrates a manufacturing process table which stores manufacturing processes performed in mounting of respective components depicted in FIG. 22 and an order of the manufacturing processes. In the example of FIG. 23, the order "1" and the order "2" are respectively set for "reflow" and "flow", indicating that manufacturing processes are performed in the order of "reflow" and "flow".

Figure 24:
FIG. 24 illustrates an example of the data configuration of an application region table.

Further, it is assumed that the application region table 13f is set as depicted in FIG. 24 regarding regions to be secured for the components 81a to 81g. FIG. 24 illustrates an example of the data configuration of the application region table. In the example of FIG. 24, the identification keys "SMD-CN1" and "SMD-CN2" indicate that a region to be secured is designated in manufacturing processes of "reflow" and "post-attachment", that is, mounting is possible in the manufacturing processes of "reflow" and "post-attachment". Further, the identification keys "SMD-CN1" and "SMD-CN2" indicate that a region to be secured is designated as a "jig region" in a case where mounting is performed in the manufacturing process of "reflow" and a region to be secured is designated as a "manual region" in a case where mounting is performed in the manufacturing process of "post-attachment".

Further, in the example of FIG. 24, the identification key "IMD" indicates that a region to be secured is designated in manufacturing processes of "flow" and "post-attachment", that is, mounting is possible in the manufacturing processes of "flow" and "post-attachment". Further, the identification key "IMD" indicates that a region to be secured is designated as an "occupied region" in a case where mounting is performed in the manufacturing process of "flow" and a region to be secured is designated as a "manual region" in a case where mounting is performed in the manufacturing process of "post-attachment".

Further, in the example of FIG. 24, the identification key "SMD" indicates that a region to be secured is designated in the manufacturing processes of "reflow" and "flow", that is, mounting is possible in the manufacturing processes of "flow" and "reflow". Further, the identification key "IMD" indicates that a region to be secured is designated as an "occupied region" in a case where mounting is performed in the manufacturing processes of "flow" and "reflow".

Further, it is assumed that the priority order table 13g is set as depicted in FIG. 25. FIG. 25 illustrates an example of the data configuration of the priority order table. As depicted in FIG. 25, a component name and a mounting category are respectively set to be "1" and "2".

The discrimination unit 15b obtains a record which corresponds to a component name, a type, and a manufacturing process for every component of which a manufacturing process is specified regarding the components 81a to 81g, from the application region table 13f. The discrimination unit 15b specifies a record of which an order of priority is the highest in the priority order table 13g, among obtained records. In the example of FIG. 25, regarding the SMD connector 81d, the mounting category is "SMD" and the component name is "SMD-CN1", so that two records correspond. Further, regarding the SMD connector 81e as well, the mounting category is "SMD" and the component name is "SMD-CN2", so that two records correspond. The discrimination unit 15b specifies a record of which the order of priority is higher in the priority order table 13g, between the corresponding two records of each of the SMD connectors 81d and 81e. On the other hand, the discrimination unit 15b specifies a record in which the mounting category is "SMD" as a corresponding record regarding the components 81a to 81c.

The discrimination unit 15b specifies a manufacturing process of which a performing order is the highest in the manufacturing process table 13e as a manufacturing process of a corresponding component, among manufacturing processes in which a region to be secured is designated in the specified records of the application region table 13f. For example, the discrimination unit 15b refers to respective manufacturing processes of the application region table 13f in an order of manufacturing processes to be performed of the manufacturing process table 13e as an order of (1) and (2) of FIG. 24. Since a jig region is set in the reflow process for the identification keys "SMD-CN1" and "SMD-CN2", the discrimination unit 15b specifies the reflow process as manufacturing processes of the SMD connectors 81d and 81e. Further, the discrimination unit 15b specifies the jig region as regions to be secured for the SMD connectors 81d and 81e. Further, since an occupied region is set in the reflow process for the identification key "SMD", the discrimination unit 15b specifies the reflow process as manufacturing processes of the components 81a to 81c of the SMD. Further, the discrimination unit 15b specifies the occupied region as regions to be secured for the components 81a to 81c of the SMD. On the other hand, since regions to be secured for the components 81f and 81g of the IMD are undefined in the reflow process, the discrimination unit 15b refers to the following flow process. Since an occupied region is set in the flow process for the identification key "IMD", the discrimination unit 15b specifies the flow process as the manufacturing processes of the components 81f and 81g of the IMD. Further, the discrimination unit 15b specifies the occupied region as regions to be secured for the components 81f and 81g of the IMD. FIG. 26 illustrates an example of a region to be secured for each component. As depicted in FIG. 26, regions to be secured for "SMD-CN1" and "SMD-CN2" are specified as "jig regions". Further, regions to be secured for "IMD" and a "post-attaching component" are specified as "occupied regions".

The discrimination unit 15b determines a before-and-after relationship among manufacturing processes of respective components regarding the components 81a to 81g. Then, the determination unit 15d compares an occupied region of a component of which a manufacturing process on the substrate 80 is determined to be earlier with a region to be secured for a component of which a manufacturing process is determined to be later, so as to determine presence/absence of interference. For example, focusing on the SMD connector 81d depicted in FIG. 22, it is assumed that interference check between the SMD connector 81d and an adjacent component is performed. The manufacturing process of the SMD connector 81d is the reflow process of the order (1). The manufacturing processes of the components 81a to 81c of the SMD and the SMD connector 81e which are adjacent components are also the reflow process of the order (1). The determination unit 15d performs interference check among a jig region of the SMD connector 81d and occupied regions of the components 81a to 81c of the SMD and the SMD connector 81e. On the other hand, the manufacturing processes of the components 81f and 81g of the IMD which are adjacent components are the flow process of the order (2). The determination unit 15d performs interference check among the occupied region of the SMD connector 81e and occupied regions of the components 81f and 81g of the IMD.

As described above, various types of information which are stored in the manufacturing process table 13e, the application region table 13f, and the priority order table 13g may be stored in one table. FIG. 27 illustrates an example of the data configuration of a table of a case where various types of information is stored in one table. FIG. 27 illustrates the data configuration which is obtained by removing the order from the table of FIG. 11. Respective items of FIG. 27 are same as those of FIG. 11, so that descriptions thereof are omitted.

Figure 28:
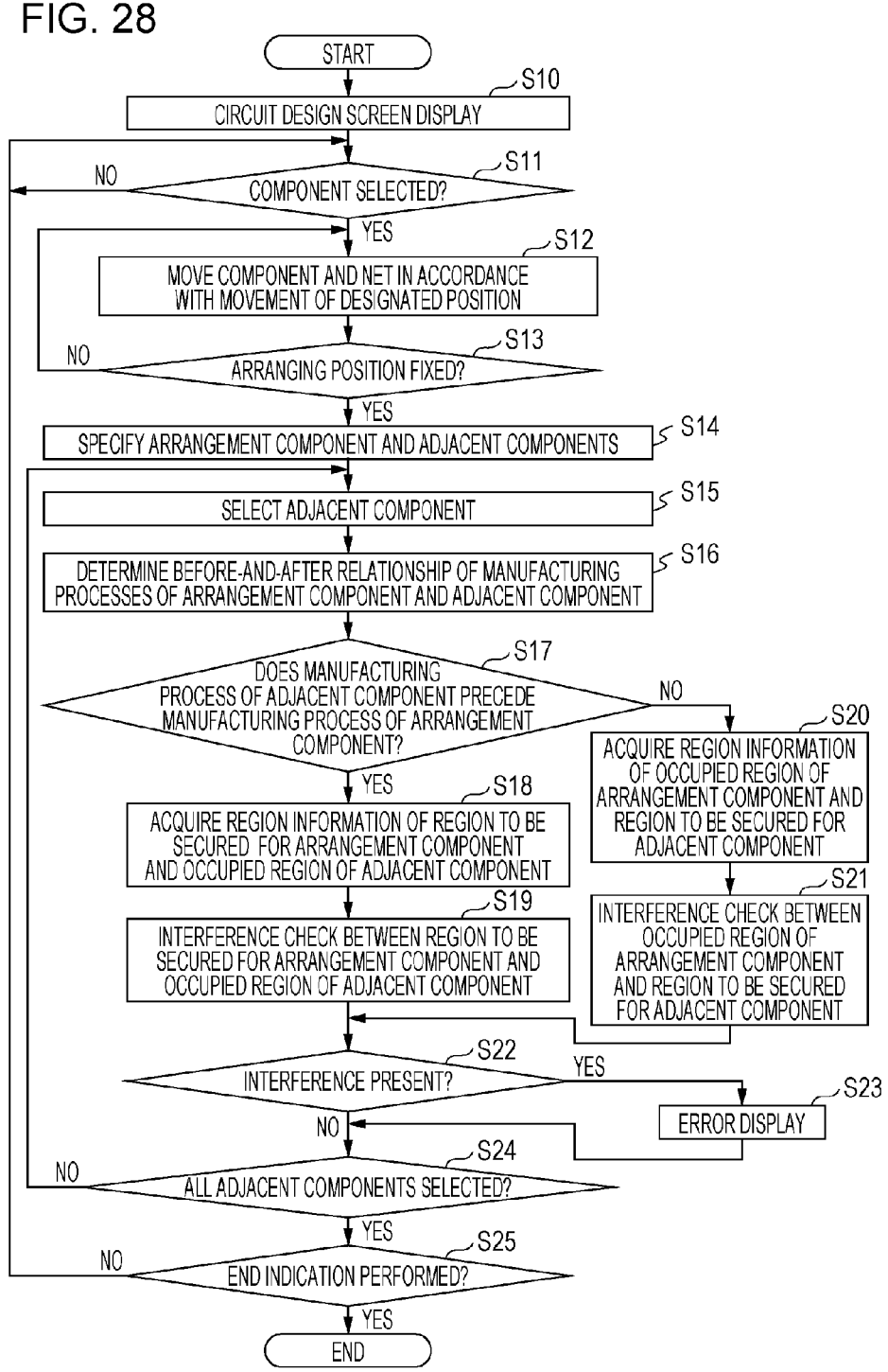
FIG. 28 is a flowchart illustrating a procedure of design support processing for supporting circuit design.

A flow of processing of checking interference of each component among components when circuit design is performed with the design support apparatus 10 according to the embodiment is now described. FIG. 28 is a flowchart illustrating a procedure of design support processing to support circuit design. This design support processing is performed at timing on which a predetermined operation to instruct the input unit 11 to start circuit design is performed, for example.

As depicted in FIG. 28, the design processing unit 15a allows the display unit 12 to display a circuit design screen on which a substrate which is a designing object, each component to be arranged on the substrate, and a net representing a connection relationship among terminals of respective components on the basis of the net connection table 13a are displayed (operation S10). The design processing unit 15a determines whether an operation to select a component is performed or not, on the basis of operation information received from the input unit 11 (operation S11). When the operation to select a component is not performed (No in operation S11), the design processing unit 15a moves to operation S11 again and waits component selection. On the other hand, when the operation to select a component is performed (Yes in operation S11), the design processing unit 15a updates a component selected on the substrate and a position of the net, on the basis of the operation information received from the input unit 11 (operation S12). The design processing unit 15a determines whether an arranging position of the selected component is fixed or not, on the basis of the operation information received from the input unit 11 (operation S13). When the arranging position of the selected component is not fixed (No in operation S13), the processing goes to operation S12. On the other hand, when the arranging position of the selected component is fixed (Yes in operation S13), the design processing unit 15a specifies an arrangement component of which the arranging position is fixed and adjacent components which are arranged in the vicinity of the periphery of the arrangement component (operation S14).

The discrimination unit 15b selects any one of the specified adjacent components (operation S15). The discrimination unit 15b specifies manufacturing processes of the arrangement component and the selected adjacent component and designation of regions to be secured and determines a before-and-after relationship between the manufacturing processes of the arrangement component and the selected adjacent component (operation S16). The discrimination unit 15b determines whether the manufacturing process of the selected adjacent component precedes with the manufacturing process of the arrangement component or not (operation S17). When the manufacturing process of the selected adjacent component precedes with the manufacturing process of the arrangement component (Yes in operation S17), the acquisition unit 15c acquires region information of a region to be secured for the arrangement component and region information of an occupied region of the selected adjacent component from the component shape library 13d (operation S18). The determination unit 15d compares the region to be secured which is indicated by the region information of the arrangement component, on a substrate which is a designing object, with the occupied region which is indicated by the region information of the selected adjacent component, so as to determine presence/absence of interference (operation S19). On the other hand, when the manufacturing process of the selected adjacent component goes after the manufacturing process of the arrangement component (No in operation S17), the acquisition unit 15c acquires region information of an occupied region of the arrangement component and region information of a region to be secure for the selected adjacent component from the component shape library 13d (operation S20). The determination unit 15d compares the occupied region which is indicated by the region information of the arrangement component, on a substrate which is a designing object, with the region to be secured which is indicated by the region information of the selected adjacent component, so as to determine presence/absence of interference (operation S21).

The determination unit 15d determines whether interference is present or not as a result of the determination of presence/absence of interference (operation S22). When interference is present (Yes in operation S22), the determination unit 15d notifies the design processing unit 15a of the arrangement component and the adjacent component that are determined that interference is present therebetween, so as to allow the design processing unit 15a to perform error display (operation S23). When interference is absent (No in operation S22), the discrimination unit 15b determines whether all of the specified adjacent components are selected or not (operation S24). When all of the adjacent components are not selected (No in operation S24), the processing goes to operation S15 and any of unselected adjacent components is selected. On the other hand, when all of the adjacent components are selected (Yes in operation S24), the design processing unit 15a determines whether a predetermined operation to instruct an end of the circuit design is performed or not (operation S25). When the predetermined operation to instruct the end is performed (Yes in operation S25), the design processing unit 15a allows the component arrangement table 13b to store information indicating arranging positions of respective components and ends the processing. On the other hand, when the predetermined operation to instruct the end is not performed (No in operation S25), the processing goes to operation S11 and the circuit design is continued.

Thus, the design support apparatus 10 determines the before-and-after relationship between manufacturing processes, in which a component is mounted, of respective components which are arranged on a substrate which is a designing object. Further, the design support apparatus 10 acquires region information of a region to be secured for a component of which a manufacturing process is determined to be later and region information of an occupied region of a component of which a manufacturing process is determined to be earlier, from the storage unit 13, for every pair of components. The design support apparatus 10 compares a region to be secured for a component of which a manufacturing process is determined to be later with an occupied region of a component of which a manufacturing process is determined to be earlier, so as to determine presence/absence of interference. Therefore, according to the design support apparatus 10, interference check is performed for every component so that a region to be secured is secured until a manufacturing process of mounting the corresponding component and an occupied region is secured in a process after the manufacturing process of mounting the corresponding component. Accordingly, according to the design support apparatus 10, such arrangement that components are arranged with excessively large intervals can be suppressed, so that component mounting design with high density can be performed.

Further, the design support apparatus 10 acquires first region information of which an order of priority is high in the priority order table 13g, among region information of a region to be secured which corresponds to any of a component name, a component kind, and a mounting category of a component of which a manufacturing process is determined to be later in the application region table 13f. Accordingly, according to the design support apparatus 10, a region to be secured which is used for interference check can be changed by setting the order of priority, among regions to be secured which correspond to any of the component name, the component kind, and the mounting category. Further, according to the design support apparatus 10, a region to be secured which is used for interference check can be designated in a unit of the component kind and the mounting category even without designating a region to be secured which is used for interference check for every component.

Further, the design support apparatus 10 sets a manufacturing process of which a performing order is the highest in the manufacturing process table 13e among manufacturing processes in which a region to be secured, which is applied to the application region table 13f, is designated, so as to determine the before-and-after relationship between mounting manufacturing processes of respective components. Accordingly, according to the design support apparatus 10, manufacturing processes of mounting each component can be specified so as to determine the before-and-after relationship between mounting manufacturing processes of respective components, even without designating a manufacturing process of mounting a component for every component in designing.

Embodiment 2

The disclosed apparatus according to the embodiment has been described above, but the disclosed technique may be variously embodied other than the above-described embodiment. Other embodiments included in the present disclosure will be described below.

For example, in the above embodiment, when it is determined that manufacturing processes of an arrangement component and an adjacent component are same as each other, interference check is performed in a manner to set a region to be secured for the arrangement component and an occupied region for the adjacent component. However, the disclosed apparatus is not limited to this. For example, when components are simultaneously mounted with a jig, jig regions have to be secured for both of an arrangement component and an adjacent component. Therefore, when it is determined that manufacturing processes of the arrangement component and the adjacent component are same as each other, interference check may be performed in a manner to set regions to be secured for both of the arrangement component and the adjacent component. Further, when manufacturing processes of the arrangement component and the adjacent component are same as each other, a region, which is used for interference check, of the adjacent component may be changed depending on the manufacturing process which is the same as that of the arrangement component. For example, in a case of a manufacturing process of press-in or mechanism assembling, interference check may be performed in a manner to set regions to be secured for both of the arrangement component and the adjacent component. Further, when manufacturing processes of the arrangement component and the adjacent component are same as each other, control information may be used to control whether interference check is performed in a manner to set a region to be secured for the arrangement component and an occupied region for the adjacent component or in a manner to set regions to be secured for both of the arrangement component and the adjacent component. For example, when the storage unit 13 stores control information and manufacturing processes of the arrangement component and the adjacent component are same as each other, the acquisition unit 15c may acquire region information of an occupied region or a region to be secured for the adjacent component in accordance with the control information.

Further, interference check between an arranging component which is arranged and an adjacent component which is adjacent to the arranging component is performed in the above-described embodiment, but the disclosed apparatus is not limited to this. For example, arranged components may be sequentially selected from design data in which components have been already arranged on a substrate and interference check between the selected component and an adjacent component which is adjacent to the selected component may be performed.

Further, the design support apparatus 10 may be a server computer, operation information about circuit design may be inputted from a client computer via a network, and various types of information may be outputted to the client computer so as to perform circuit design on a screen of the client computer.

Respective elements of each device depicted in the drawings are functionally conceptual and are not have to be physically configured as depicted in the drawings. That is, a specific state of dispersion and integration of respective devices is not limited to the drawings, and all or part of the devices may be configured in a manner to be functionally or physically dispersed and/or integrated in an arbitrary unit depending on various loads or using states. For example, respective processing units which are the design processing unit 15a, the discrimination unit 15b, the acquisition unit 15c, and the determination unit 15d depicted in FIG. 1 may be arbitrarily integrated. Further, all of or arbitrary part of respective processing functions performed in each processing unit may be realized by a CPU or a program which is analyzed and executed by the CPU or may be realized as hardware employing a wired logic.

[Design Support Program]

Figure 29:
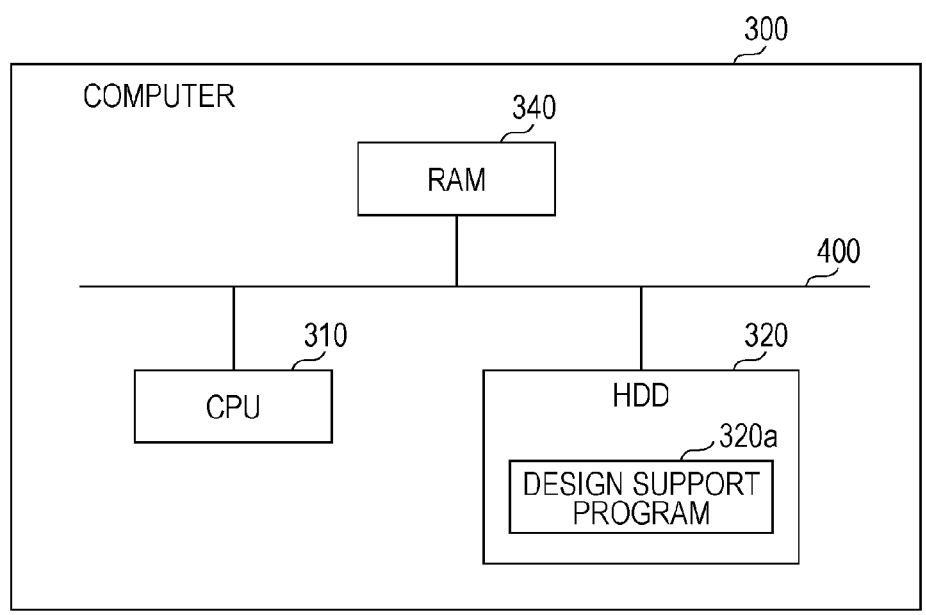
FIG. 29 illustrates a computer that executes a design support program.

Various types of processing described in the above-mentioned embodiment can be realized also by executing a prepared program by a computer system such as a personal computer and a work station. Therefore, an example of a computer system which executes a program having functions same as the above-described embodiment is described blow. FIG. 29 illustrates a computer which executes a design support program.

As depicted in FIG. 29, a computer 300 includes a central processing unit (CPU) 310, a hard disk drive (HDD) 320, and a random access memory (RAM) 340. Respective units 310 to 340 are coupled with each other via a bus 400. In the HDD 320, a table having the same function as each table depicted in FIG. 1 is stored.

In the HDD 320, a design support program 320a which exerts functions same as those of the design processing unit 15a, the discrimination unit 15b, the acquisition unit 15c, and the determination unit 15d illustrated in above-described Embodiment 1 is preliminarily stored. Here, the design support program 320a may be arbitrarily separated.

The HDD 320 further stores various types of information. For example, the HDD 320 stores various types of information corresponding to the net connection table 13a, the component arrangement table 13b, the component attribute library 13c, the component shape library 13d, the manufacturing process table 13e, the application region table 13f, and the priority order table 13g depicted in FIG. 1.

Then, the CPU 310 reads out the design support program 320a from the HDD 320, develops the design support program 320a on the RAM 340, and executes various types of processing by using various types of information stored in the HDD 320, thus performing the same operation as that of the control unit 15 illustrated in Embodiment 1. That is, the design support program 320a performs operations same as those of the design processing unit 15a, the discrimination unit 15b, the acquisition unit 15c, and the determination unit 15d illustrated in Embodiment 1.

Here, the design support program 320a described above does not have to be stored in the HDD 320 from the beginning.

For example, the program is stored in "portable physical media" such as a flexible disk (FD), a CD-ROM, a DVD disk, a magnetooptic disk, and an IC card, which are inserted into the computer 300. Then, the computer 300 may read out the program from these media so as to execute the program.

Further, the program is stored in "other computers (or servers)" that are connected to the computer 300 via a public line, Internet, LAN, WAN, or the like. Then, the computer 300 may read out the program from these computers so as to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A design support apparatus, comprising:
    a storage unit that stores mounting information for a component that is mounted by a mounting process and for an order of the mounting process in which each component is mounted on a substrate and a component that is mounted in each manufacturing process, first region information indicating a region to be secured in mounting of each component on the substrate when each component is mounted on the substrate, and second region information indicating a region occupied on the substrate;
    a discrimination unit configured to determine a before-and-after relationship between manufacturing processes of mounting a first component and a second component that are arranged on the substrate, and that are handled as designing objects, on basis of the mounting information that is stored in the storage unit;
    an acquisition unit configured to acquire the first region information for the component of which the manufacturing process is determined to be later by the discrimination unit between the first component and the second component and acquire the second region information for the component of which the manufacturing process is determined to be earlier, from the storage unit; and a determination unit configured to compare the first region information and the second region information that are acquired by the acquisition unit, so as to determine presence of interference, wherein the storage unit stores a plurality of pieces of the first region information, designation information designating the first region information that is applied to any of a component name, a component kind, and a mounting category, and priority order information indicating a priority order representing whether priority is given to the first region information of the component name, the first region information of the component kind, or the first region information of the mounting category, and the acquisition unit acquires the first region information in a high priority order that is indicated by the priority order information, among the plurality of pieces of the first region information that correspond to any of the component name, the component kind, and the mounting category of a component of which the manufacturing process is specified to be later and are designated by the designation information.

2. The design support apparatus according to claim 1, wherein the storage unit stores designation information in which the first region information, the first region information being respectively applied to each component that can be mounted in a corresponding manufacturing process, is designated for each manufacturing process, and manufacturing process information indicating manufacturing processes that are performed in mounting of a component on the substrate and an order of the manufacturing processes, and the discrimination unit sets a manufacturing process of which a performing order is the highest in the manufacturing process information as a manufacturing process of the corresponding component, among manufacturing processes in which the first region information, the first region information being applied to a corresponding component, is respectively designated in the designation information, so as to determine the before-and-after relationship between the manufacturing processes of mounting the first component and the second component.

3. A computer-readable, non-transitory medium storing a computer program that causes an information processing device to execute a process, the process comprising:

determining a before-and-after relationship between manufacturing processes of respectively mounting a first component and a second component that are arranged on a substrate, and that are handled as designing objects, on basis of mounting information, the mounting information being stored in a storage unit, on an order of manufacturing processes in which each component is mounted on the substrate and a component that is mounted in each manufacturing process;

acquiring first region information indicating a region to be secured in mounting of the corresponding component on the substrate for the component of which the manufacturing process is determined to be later between the first component and the second component, and second region information indicating a region occupied when the corresponding component is mounted on the substrate for the component of which the manufacturing process is determined to be earlier, from the storage unit; and comparing the first region information and the second region information that are acquired, so as to determine presence of interference, wherein the processing of acquiring the first region information acquires the first region information of which a priority order indicated by priority order information is high among a plurality of pieces of the first region information that correspond to any of a component name, a component kind, and a mounting category of a component of which the manufacturing process is specified to be later, in designation information designating the first region information to be applied from the plurality of pieces of the first region information for any of the component name, the component kind, and the mounting category.

4. The computer program according to claim 3, wherein in the processing of determining the before-and-after relationship between manufacturing processes, regarding the first component and the second component, a manufacturing process of which a performing order is the highest in manufacturing process information, the manufacturing process information indicating manufacturing processes that are performed in mounting of a component on the substrate and an order of the manufacturing processes, is set as a manufacturing process of the corresponding component, for every manufacturing process, among manufacturing processes to which the first region information applied to the corresponding component is designated in designation information in which the first region information applied to each component that can be mounted in a corresponding manufacturing process is designated, and the before-and-after relationship between the manufacturing processes in which the first component and the second component are respectively mounted is determined.

5. A method for design support by which a computer performs respective processing, the method comprising:

determining a before-and-after relationship between manufacturing processes of respectively mounting a first component and a second component that are arranged on a substrate, and that are handled as designing objects, on basis of mounting information, the mounting information being stored in a storage unit, on an order of manufacturing processes in which each component is mounted on the substrate and a component that is mounted in each manufacturing process;

acquiring first region information indicating a region to be secured in mounting of the corresponding component on the substrate for the component of which the manufacturing process is determined to be later between the first component and the second component, and second region information indicating a region occupied when the corresponding component is mounted on the substrate for the component of which the manufacturing process is determined to be earlier, from the storage unit; and comparing the first region information and the second region information that are acquired, so as to determine presence of interference, wherein the processing of acquiring the first region information acquires the first region information of which a priority order indicated by priority order information is high among a plurality of pieces of the first region information that correspond to any of a component name, a component kind, and a mounting category of a component of which the manufacturing process is specified to be later, in designation information designating the first region information to be applied from the plurality of pieces of the first region information for any of the component name, the component kind, and the mounting category.

6. The method for design support according to claim 5, wherein in the processing of determining the before-and-after relationship between manufacturing processes, regarding the first component and the second component, a manufacturing process of which a performing order is the highest in manufacturing process information, the manufacturing process information indicating manufacturing processes that are performed in mounting of a component on the substrate and an order of the manufacturing processes, is set as a manufacturing process of the corresponding component, for every manufacturing process, among manufacturing processes to which the first region information applied to the corresponding component is designated in designation information in which the first region information applied to each component that can be mounted in a corresponding manufacturing process is designated, and the before-and-after relationship between the manufacturing processes in which the first component and the second component are respectively mounted is determined.

7. A design support apparatus, comprising:
a storage unit that stores mounting information for a component that is mounted by a mounting process and for an order of the mounting process in which each component is mounted on a substrate and a component that is mounted in each manufacturing process, first region information indicating a region to be secured in mounting of each component on the substrate when each component is mounted on the substrate, and second region information indicating a region occupied on the substrate;
a discrimination unit configured to determine a before-and-after relationship between manufacturing processes of mounting a first component and a second component that are arranged on the substrate, and that are handled as designing objects, on basis of the mounting information that is stored in the storage unit;
an acquisition unit configured to acquire the first region information for the component of which the manufacturing process is determined to be later by the discrimination unit between the first component and the second component and acquire the second region information for the component of which the manufacturing process is determined to be earlier, from the storage unit; and
a determination unit configured to compare the first region information and the second region information that are acquired by the acquisition unit, so as to determine presence of interference, wherein
the storage unit stores designation information in which the first region information, the first region information being respectively applied to each component that can be mounted in a corresponding manufacturing process, is designated for each manufacturing process, and manufacturing process information indicating manufacturing processes that are performed in mounting of a component on the substrate and an order of the manufacturing processes, and
the discrimination unit sets a manufacturing process of which a performing order is the highest in the manufacturing process information as a manufacturing process of the corresponding component, among manufacturing processes in which the first region information, the first region information being applied to a corresponding component, is respectively designated in the designation information, so as to determine the before-and-after relationship between the manufacturing processes of mounting the first component and the second component.

8. A computer-readable, non-transitory medium storing a computer program that causes an information processing device to execute a process, the process comprising:
determining a before-and-after relationship between manufacturing processes of respectively mounting a first component and a second component that are arranged on a substrate, and that are handled as designing objects, on basis of mounting information, the mounting information being stored in a storage unit, on an order of manufacturing processes in which each component is mounted on the substrate and a component that is mounted in each manufacturing process;
acquiring first region information indicating a region to be secured in mounting of the corresponding component on the substrate for the component of which the manufacturing process is determined to be later between the first component and the second component, and second region information indicating a region occupied when the corresponding component is mounted on the substrate for the component of which the manufacturing process is determined to be earlier, from the storage unit; and
comparing the first region information and the second region information that are acquired, so as to determine presence of interference, wherein
the processing of determining the before-and-after relationship between manufacturing processes, regarding the first component and the second component, a manufacturing process of which a performing order is the highest in manufacturing process information, the manufacturing process information indicating manufacturing processes that are performed in mounting of a component on the substrate and an order of the manufacturing processes, is set as a manufacturing process of the corresponding component, for every manufacturing process, among manufacturing processes to which the first region information applied to the corresponding component is designated in designation information in which the first region information applied to each component that can be mounted in a corresponding manufacturing process is designated, and the before-and-after relationship between the manufacturing processes in which the first component and the second component are respectively mounted is determined.

9. A method for design support by which a computer performs respective processing, the method comprising:
determining a before-and-after relationship between manufacturing processes of respectively mounting a first component and a second component that are arranged on a substrate, and that are handled as designing objects, on basis of mounting information, the mounting information being stored in a storage unit, on an order of manufacturing processes in which each component is mounted on the substrate and a component that is mounted in each manufacturing process;
acquiring first region information indicating a region to be secured in mounting of the corresponding component on the substrate for the component of which the manufacturing process is determined to be later between the first component and the second component, and second region information indicating a region occupied when the corresponding component is mounted on the substrate for the component of which the manufacturing process is determined to be earlier, from the storage unit; and comparing the first region information and the second region information that are acquired, so as to determine presence of interference, wherein in the processing of determining the before-and-after relationship between manufacturing processes, regarding the first component and the second component, a manufacturing process of which a performing order is the highest in manufacturing process information, the manufacturing process information indicating manufacturing processes that are performed in mounting of a component on the substrate and an order of the manufacturing processes, is set as a manufacturing process of the corresponding component, for every manufacturing process, among manufacturing processes to which the first region information applied to the corresponding component is designated in designation information in which the first region information applied to each component that can be mounted in a corresponding manufacturing process is designated, and the before-and-after relationship between the manufacturing processes in which the first component and the second component are respectively mounted is determined.

* * * * *